US012393152B2

(12) United States Patent
Mori et al.

(10) Patent No.: US 12,393,152 B2
(45) Date of Patent: Aug. 19, 2025

(54) IMAGE FORMING SYSTEM

(71) Applicant: CANON KABUSHIKI KAISHA, Tokyo (JP)

(72) Inventors: Kota Mori, Chiba (JP); Yoshiro Tsukada, Chiba (JP); Tohru Nakaegawa, Chiba (JP); Kenichiro Kitajima, Ibaraki (JP); Naoyuki Yamamoto, Chiba (JP); Shuichi Tamura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 18/522,682

(22) Filed: Nov. 29, 2023

(65) Prior Publication Data

US 2024/0192628 A1 Jun. 13, 2024

(30) Foreign Application Priority Data

Dec. 8, 2022 (JP) ................................ 2022-196468

(51) Int. Cl.
*B65H 45/12* (2006.01)
*G03G 15/00* (2006.01)

(52) U.S. Cl.
CPC ......... *G03G 15/6582* (2013.01); *B65H 45/12* (2013.01); *G03G 15/5016* (2013.01); *B65H 2301/45* (2013.01); *B65H 2701/1722* (2013.01)

(58) Field of Classification Search
CPC ...... B65H 2701/17224; B65H 2301/45; B65H 2701/1722; B65H 45/12; G03G 15/5016; G03G 15/6582
See application file for complete search history.

(56) References Cited

U.S. PATENT DOCUMENTS 11,772,408 B2 10/2023 Tsukada et al.
2002/0051027 A1* 5/2002 Kyogoku ................ B41J 2/325 347/19

(Continued)

FOREIGN PATENT DOCUMENTS

JP 2003296090 A * 10/2003
JP 2008168535 A * 7/2008

(Continued)

OTHER PUBLICATIONS

U.S. Appl. No. 18/240,440, filed Aug. 31, 2023 (First Named Inventor: Shuichi Tamura).

(Continued)

*Primary Examiner* — Jennifer Bahls
(74) *Attorney, Agent, or Firm* — Venable LLP

(57) ABSTRACT

An image forming system includes an image forming apparatus, a pressure-bonding processing apparatus, an inputting portion, and a controller. The controller changes, in a case that directions of a front surface and a back surface of a recording material inputting portion and different from the directions of the front surface and the back surface in which a pressure-bonding printed matter is capable of being properly prepared, an image formation order of image forming data to an order in which the pressure-bonding printed matter is capable of being properly prepared in the directions of the front surface and the back surface of the recording material inputted by the inputting portion.

16 Claims, 13 Drawing Sheets

| | FILDING PROCESSING APPARATUS | | | | IMAGE FORMING APPARATUS | |
|---|---|---|---|---|---|---|
| | FEEDING DIRECTION (FOLD POSITION) | | FOLDING DIRECTION | | DISCH DIRECTION | SET DIRECTION |
| E1 | | FDLE | ← PS | FD VF | FACE UP | PS : UP |
| E2 | | FDTE | | | FACE DOWN | PS : DOWN |
| E3 | | FDLE | ← NPS | FD MF | FACE UP | PS : DOWN |
| E4 | | FDTE | | | FACE DOWN | PS : UP |

(56) References Cited

U.S. PATENT DOCUMENTS

| | | | | |
|---|---|---|---|---|
| 2008/0018093 | A1* | 1/2008 | Shinchi | B41J 13/0036 283/67 |
| 2023/0062516 | A1* | 3/2023 | Hatanaka | B42D 15/04 |
| 2023/0068570 | A1 | 3/2023 | Tamura et al. | |

FOREIGN PATENT DOCUMENTS

| | | |
|---|---|---|
| JP | 2012-073511 A | 4/2012 |
| JP | 2014-035454 A | 2/2014 |

OTHER PUBLICATIONS

U.S. Appl. No. 18/522,643, filed Nov. 29, 2023 (First Named Inventor: Yoshiro Tsukada).
U.S. Appl. No. 18/522,633, filed Nov. 29, 2023 (First Named Inventor: Tohru Nakaegawa).
U.S. Appl. No. 18/522,654, filed Nov. 29, 2023 (First Named Inventor: Kenichiro Kitajima).

* cited by examiner

| | FILDING PROCESSING APPARATUS | | | | IMAGE FORMING APPARATUS | |
|---|---|---|---|---|---|---|
| | FEEDING DIRECTION (FOLD POSITION) | | FOLDING DIRECTION | | DISCH DIRECTION | SET DIRECTION |
| E1 |  | FDLE |  | FD VF | FACE UP | PS : UP |
| E2 |  | FDTE | | | FACE DOWN | PS : DOWN |
| E3 |  | FDLE |  | FD MF | FACE UP | PS : DOWN |
| E4 |  | FDTE | | | FACE DOWN | PS : UP |

(a)

(b)

(a)

(b)

| | FILDING PROCESSING APPARATUS | | | | IMAGE FORMING APPARATUS | |
|---|---|---|---|---|---|---|
| | FEEDING DIRECTION (FOLD POSITION) | | FOLDING DIRECTION | | DISCH DIRECTION | SET DIRECTION |
| F1 | ① | FDTE | ① ② PS ③ | FD ZF | FACE UP | PSLE |
| F2 | ⑥ | FDTE | ⑥ ⑤ PS ④ | | FACE DOWN | |
| F3 | ① | FDLE | PS ③ ② ① | FD RZF | FACE UP | PSTE |
| F4 | ⑥ | FDLE | PS ④ ⑤ ⑥ | | FACE DOWN | |

(a)

(b)

IMAGE FORMING SYSTEM

FIELD OF THE INVENTION AND RELATED ART

The present invention relates to an image forming system for preparing (creating) a pressure-bonding printed matter by forming an image on a recording material, folding (bending) the recording material on which the image is formed, and pressure-bonding the recording material under application of heat and pressure to the folded recording material.

Conventionally, the image forming system for preparing the pressure-bonding printed matter excellent in confidentiality of information has been proposed (Japanese Laid-Open Patent Application (JP-A) 2014-35454). As the pressure-bonding printed matter, it is possible to cite, for example, a pressure-bonding postcard such that (opposing) surfaces thereof are superposed and pseudo-bonded together and that personal information cannot be read until the surfaces pseudo-bonded together are peeled off from each other. Here, pseudo-bonding refers to one form of bonding such that the surfaces are peelable after the bonding and are not readily bonded again after the peeling. As a type in which the pseudo-bonding is made, there is a paste type in which the pseudo-bonding is made by using a recording material of a pre-paste type in which a pressure-bonding paste is applied in advance.

The pressure-bonding printed matter is prepared in a manner such that a toner image is formed on the recording material on the basis of image forming data by an image forming apparatus and that the recording material on which the toner image is formed is then folded and is further heated and pressed by the pressure-bonding processing apparatus. The image forming data includes an image relating to information desired to be kept a secret (hereinafter, this image is referred to as a secret information image) and an image relating to non-secret information (hereinafter, this image is referred to as a non-secret information image) in an image formation order. In order to obtain a pressure-bonding printed matter prepared by forming the secret information image on the paste surface (also referred to as a pressure-bonding surface (side)) on which pressure-bonding paste is applied and forming the non-secret information image on a non-paste surface on which the pressure-bonding paste is not applied, a user is required to set the recording material in a cassette or a tray of the image forming apparatus in a set mode determined depending on a specification of the image forming apparatus and a specification of the pressure-bonding processing apparatus.

Therefore, conventionally, in the case where the user sets the recording material in an erroneous set mode, a pressure-bonding postcard such that a non-secret information image is formed on a paste surface and that a secret information image is formed on a non-paste surface was transferred. Further, conventionally, even when the user properly sets the recording material in a (correct) set mode, an appropriate pressure-bonding printed matter was not prepared in some instances. This is caused because the image formation order of the secret information image and the non-secret information image in the image forming data and the set mode of the recording material set by the user do not coincide with each other. Therefore, the user has to check whether or not appropriate pressure-bonding postcard is prepared by expressly performing test printing, and thus the preparation of the appropriate pressure-bonding postcard taken time and became troublesome.

SUMMARY OF THE INVENTION

According to an aspect of the present invention, there is provided an image forming system comprising: an image forming apparatus including a stacking portion capable of stacking a recording material having an adhesive region in which an adhesive is applied onto a surface of the recording material, an image forming unit for forming an image on the recording material, and a fixing portion for fixing the image formed on the recording material; a pressure-bonding processing apparatus including a folding processing portion for folding the recording material fed from the image forming apparatus, and a pressure-bonding portion capable of pressure-bonding the recording material folded by the folding processing portion under pressure application; an inputting portion capable of inputting directions of a front surface and a back surface of the recording material stacked on the stacking portion; and a controller configured to change, in a case that the directions of the front surface and the back surface of the recording material inputting portion are different from the directions of the front surface and the back surface in which a pressure-bonding printed matter is capable of being properly prepared, an image formation order of image forming data to an order in which the pressure-bonding printed matter is capable of being properly prepared in the directions of the front surface and the back surface of the recording material inputted by the inputting portion.

Further features of the present invention will become apparent from the following description of exemplary embodiments with reference to the attached drawings.

Figure 3:
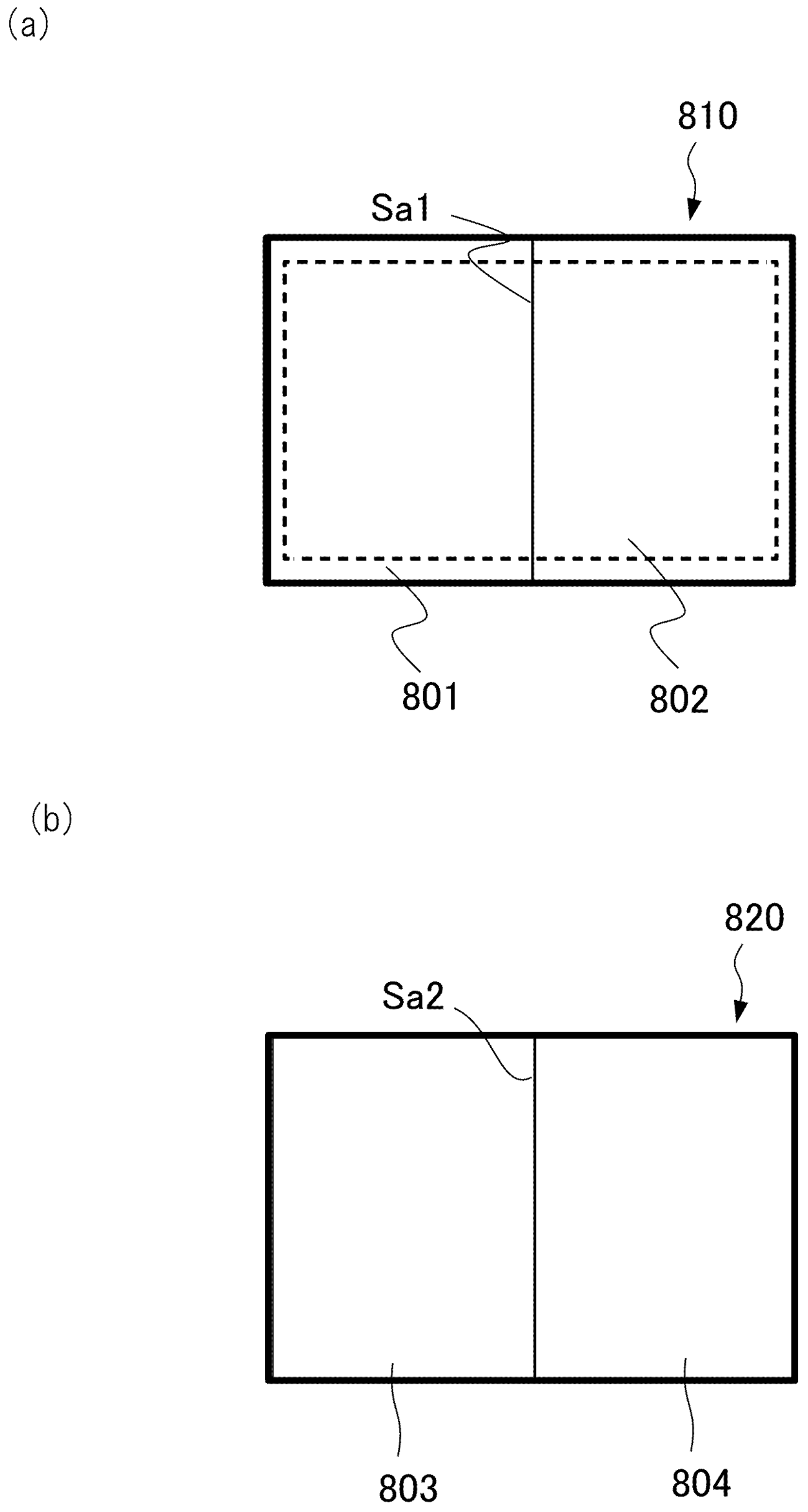

Parts (a) and (b) of FIG. 3 are schematic views showing a pressure-bonding postcard sheet for two-folding, in which part (a) shows a first surface side, and part (b) shows a second surface side.

Figure 4:
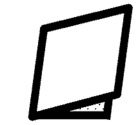
Figure 4:
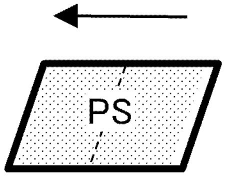
Figure 4:
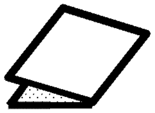
Figure 4:
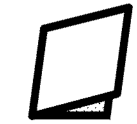
Figure 4:
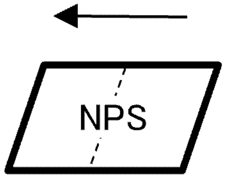
Figure 4:
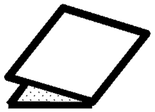

FIG. 4 is a schematic view of set modes of the pressure-bonding postcard sheet for the two-folding.

Figure 5:
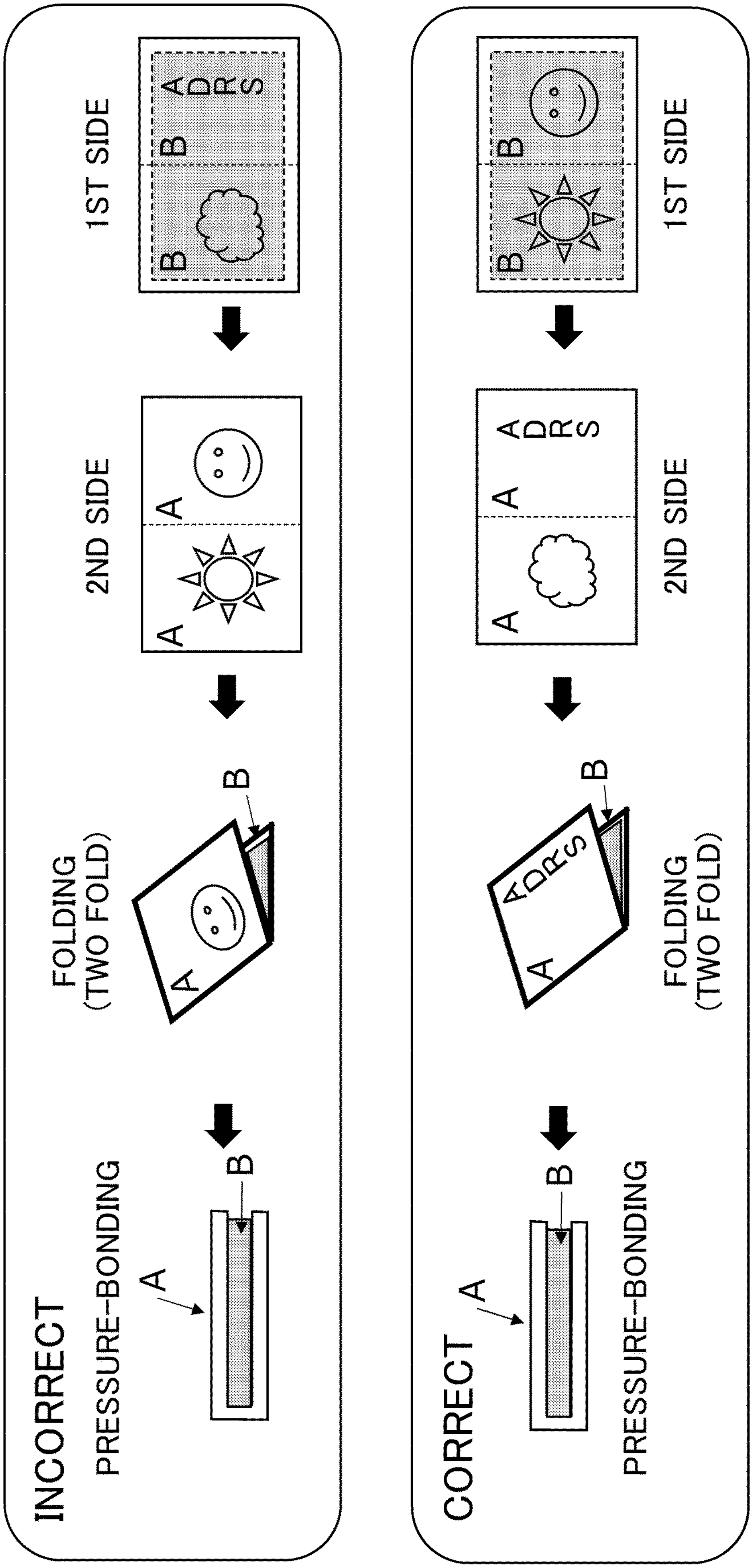

FIG. 5 is a schematic view showing a preparation (creation) example of a pressure-bonding postcard in the case where an image formation order of image forming data and the set mode of the recording material (pressure-bonding postcard sheet for the two-folding) do not coincide with each other ("INCORRECT") and in the case where the image formation order of the image forming data and the set mode of the recording material coincide with each other ("CORRECT").

Figure 6:
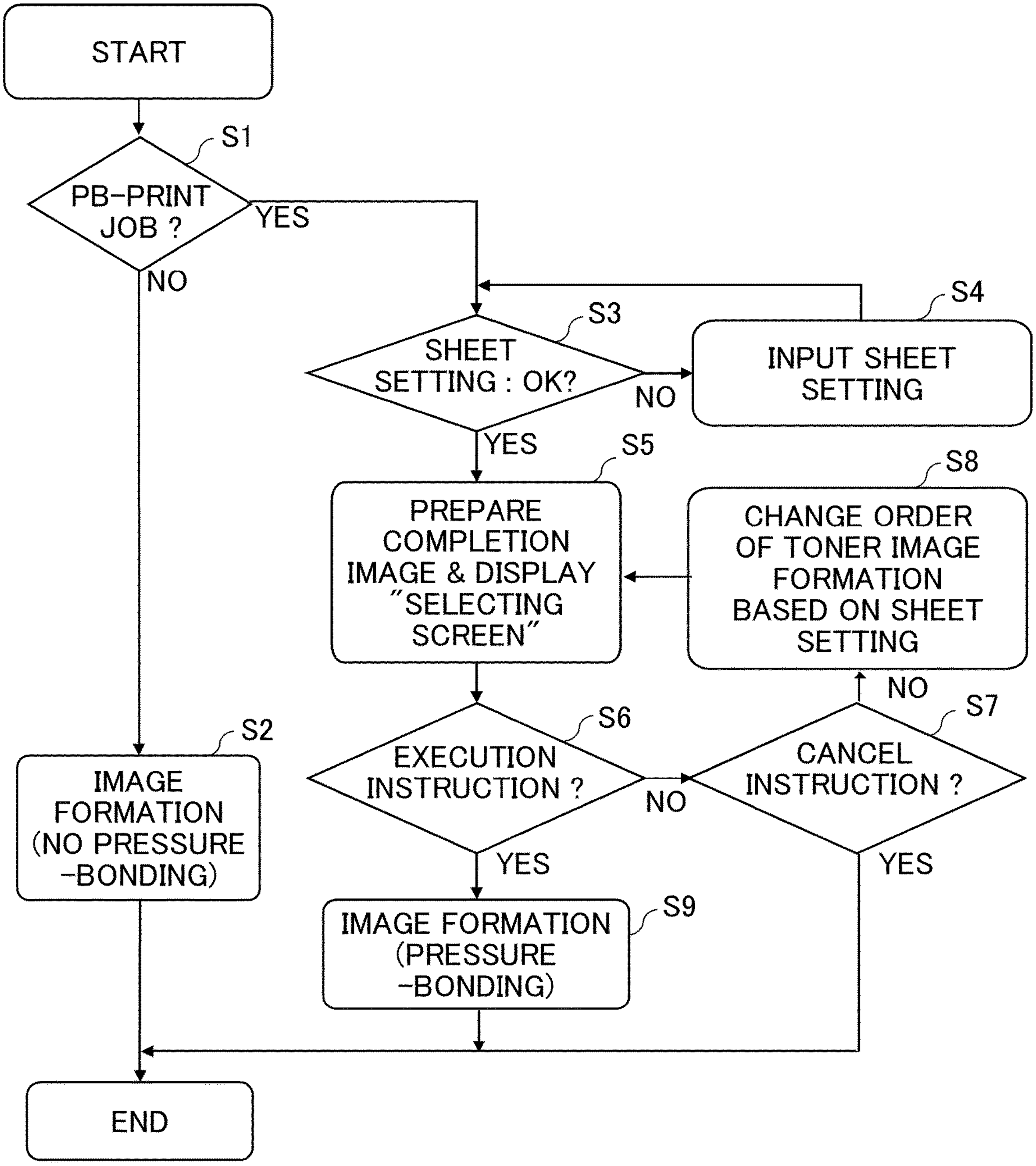

FIG. 6 is a flowchart showing pressure-bonding printed matter preparation processing.

Figure 7:
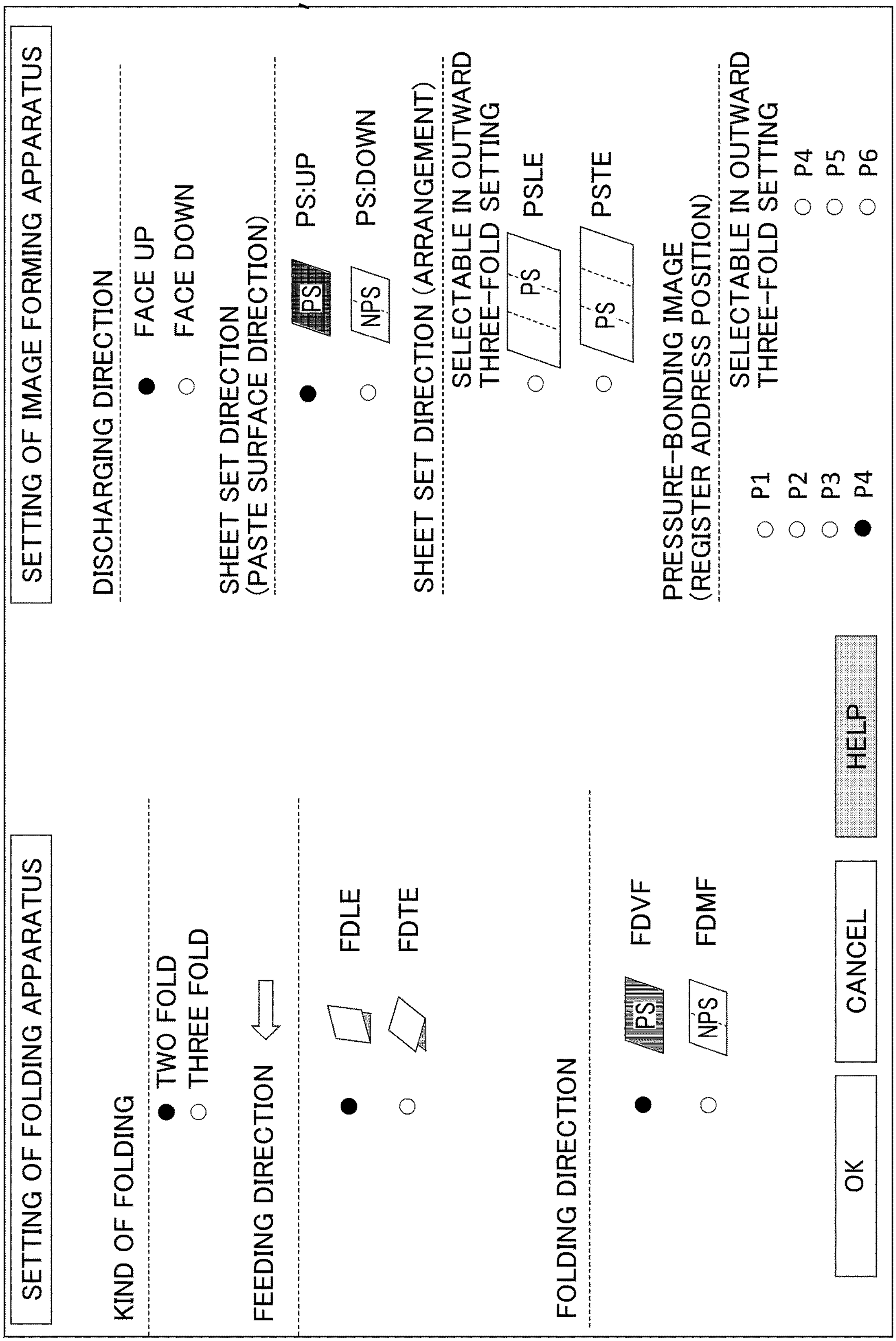

FIG. 7 is a schematic view showing an example of a setting screen.

Figure 8:
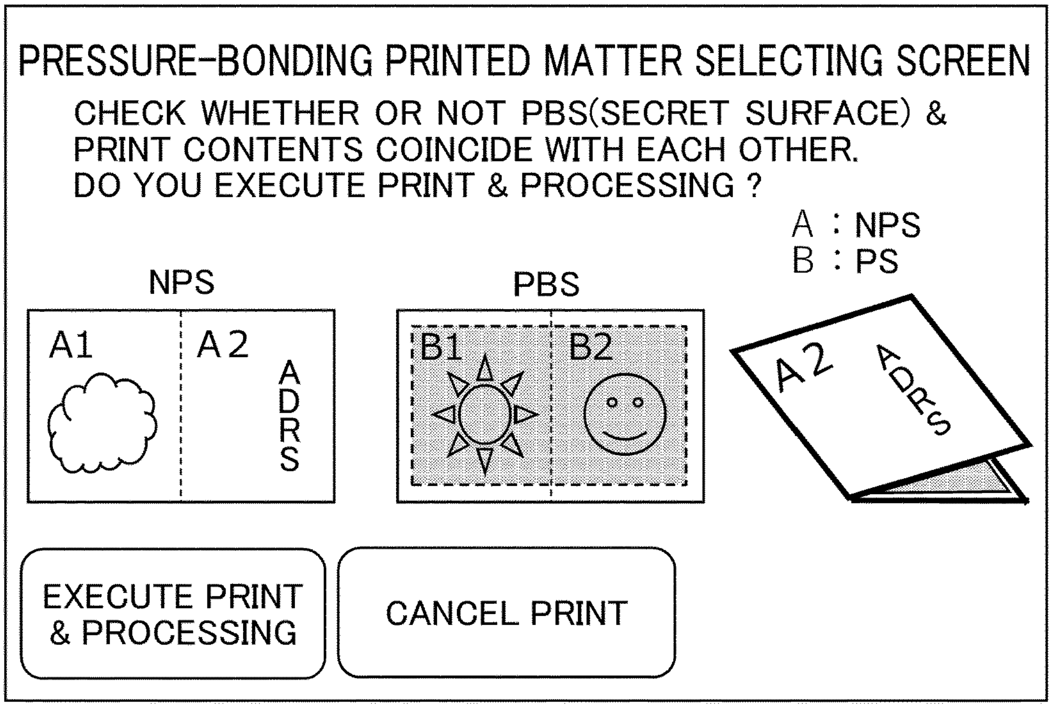
Figure 8:
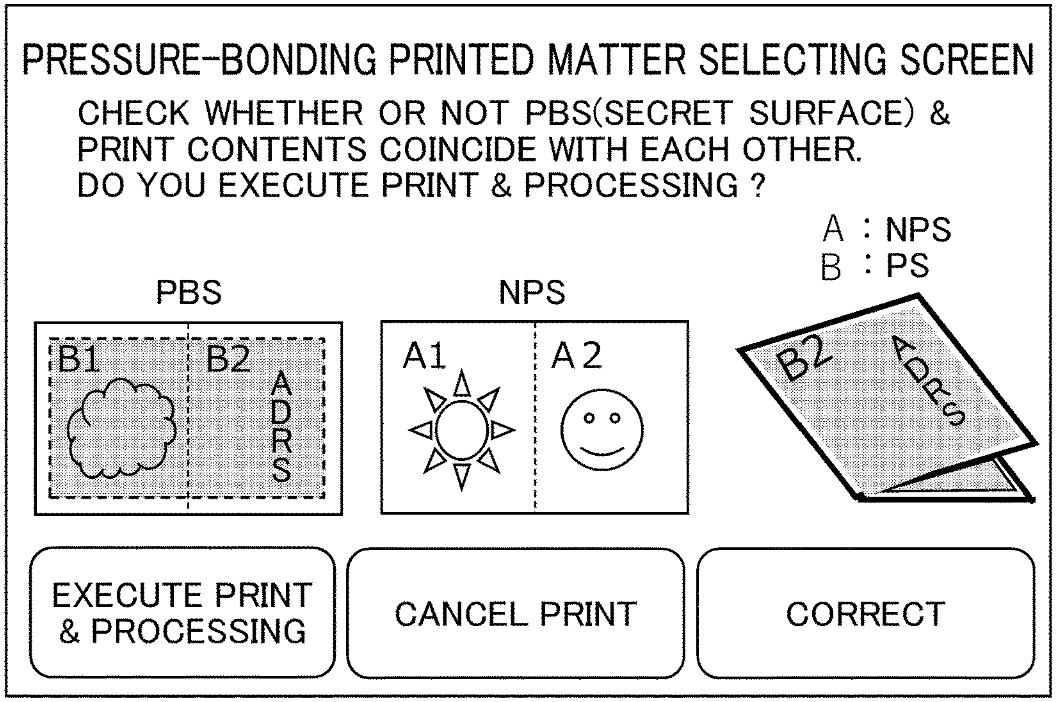

Parts (a) and (b) of FIG. 8 are schematic views each showing an example of "pressure-bonding printed matter selecting screen" during two-folding, in which part (a) shows the case where the image formation order of the image forming data and the recording material set mode coincide with each other (after change), and part (b) shows the case where the image formation order of the image forming data and the recording material set mode do not coincide with each other (before change).

Figure 9:
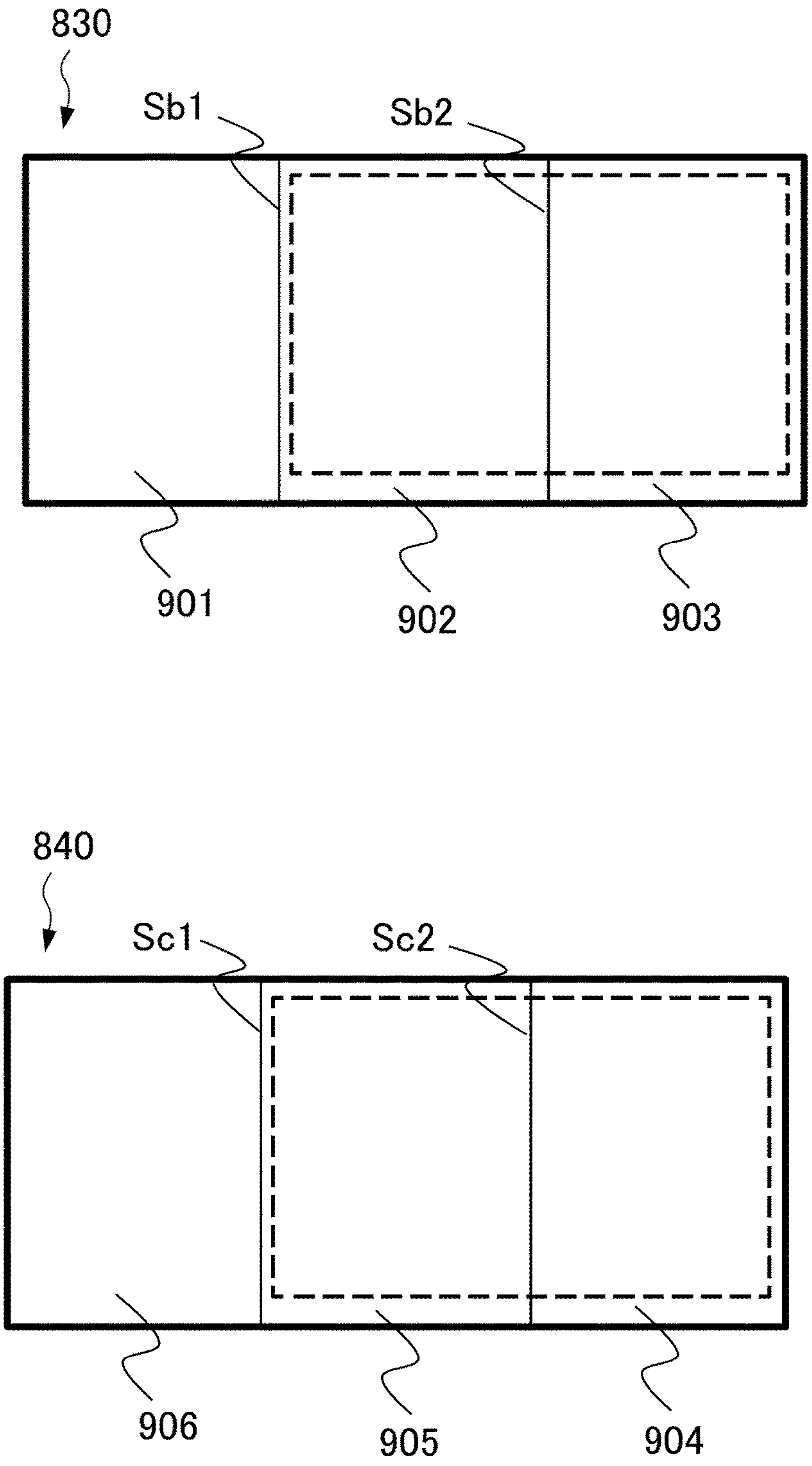

Parts (a) and (b) of FIG. 9 are schematic views showing a pressure-bonding postcard sheet for outward three-folding, in which part (a) shows a first surface side, and part (b) shows a second surface side.

Figure 10:
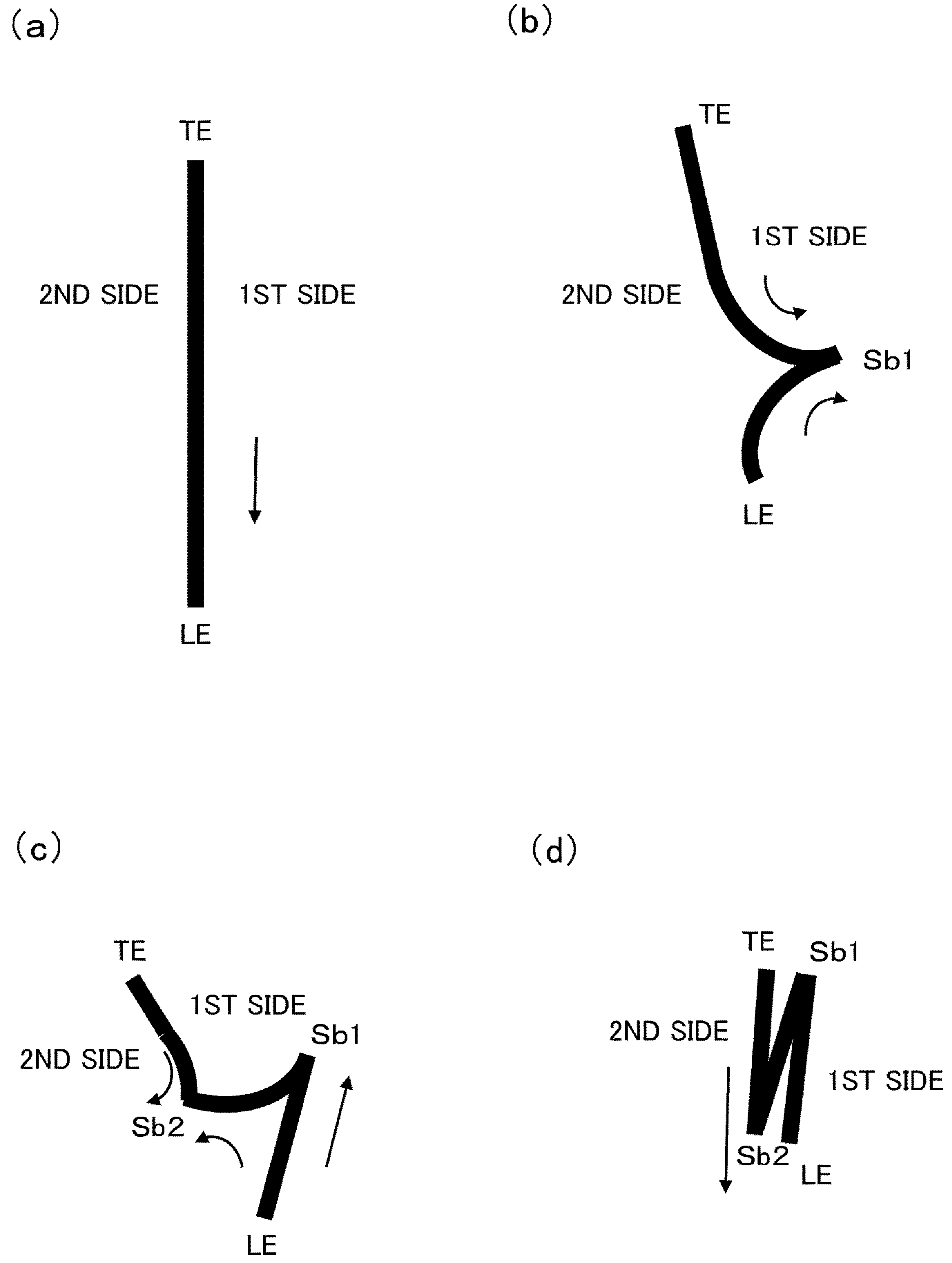

Parts (a) to (d) of FIG. 10 are schematic views each showing a state of a pressure-bonding postcard sheet during an outward three-folding operation, in which part (a) shows the state before a start of the outward three-folding operation, part (b) shows the state in a first folding operation, part (c) shows the state in a second folding operation, and part (d) shows the state after an end of the outward three-folding operation.

Figure 11:
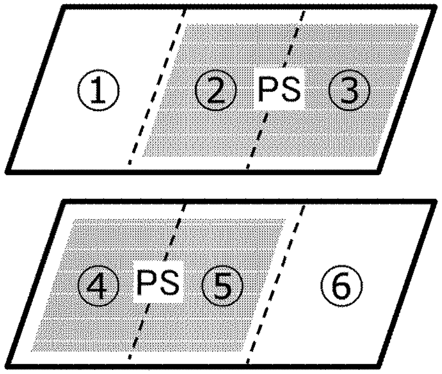

FIG. 11 is a schematic view showing a set mode of the pressure-bonding postcard sheet for the outward three-folding.

Figure 12:
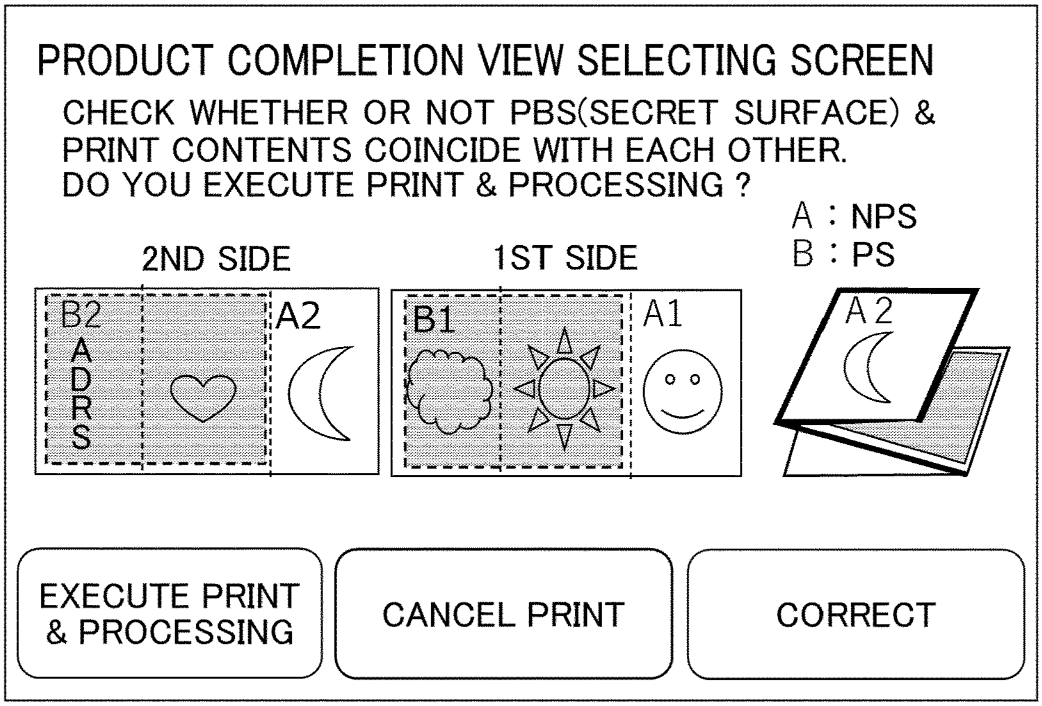
Figure 12:
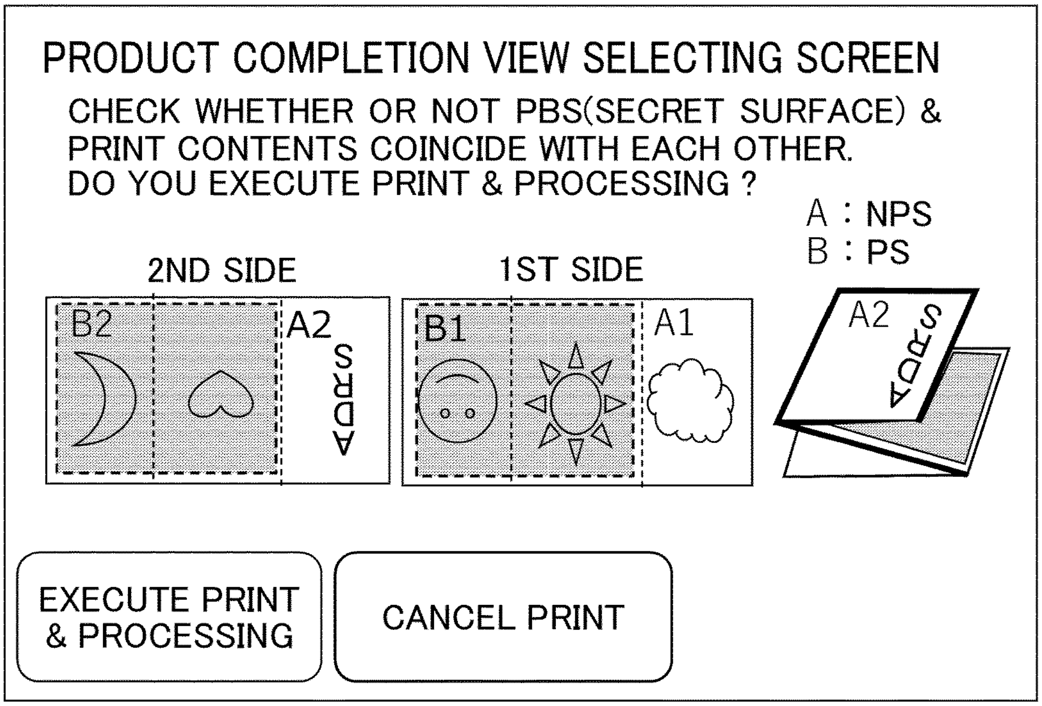

Parts (a) and (b) of FIG. 12 are schematic views each showing an example of a "pressure-bonding printed matter selecting screen" during the outward three-folding, in which part (a) shows the selecting screen before a change in image formation order, and part (b) shows the selecting screen after the change in image formation order.

Figure 13:
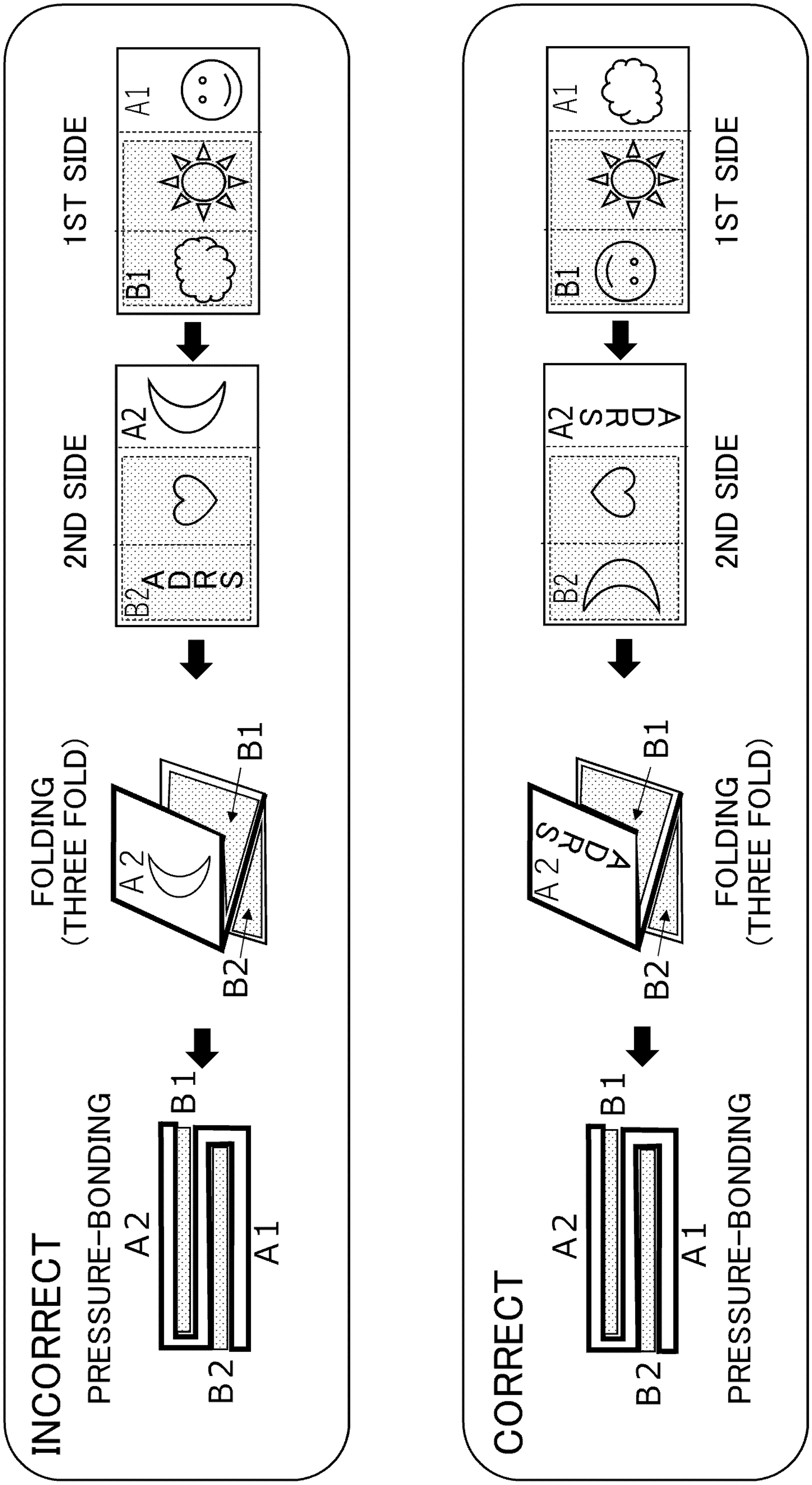

FIG. 13 is a schematic view of a preparation example of a pressure-bonding printed matter before and after the change in image formation order of the image forming data on the pressure-bonding postcard sheet for the outward three-folding.

DESCRIPTION OF THE EMBODIMENTS

<Image Forming System>

In the following, an embodiment will be described. First, an image forming system 1X of this embodiment will be described using FIG. 1. The image forming system 1X of this embodiment includes an image forming apparatus 100 for forming a toner image on a recording material S and a pressure-bonding processing apparatus 200 for subjecting the recording material S, on which the toner image is formed by the image forming apparatus 100, to pressure-bonding processing. The pressure-bonding processing apparatus 200 is a post-step unit retrofittable to the image forming apparatus 100 for function expansion, and the image forming apparatus 100 and the pressure-bonding processing apparatus 200 are provided detachably mountable to each other and are connected to each other so as to be capable of delivering the recording material S therebetween. This image forming system 1X is capable of preparing (creating) a pressure-bonding printed matter such as a pressure-bonding postcard by feeding the recording material S, on which the image is formed by the image forming apparatus 100, to the pressure-bonding processing apparatus 200 and then by folding and pressure-bonding the recording material S by the pressure-bonding processing apparatus 200.

Figure 1:
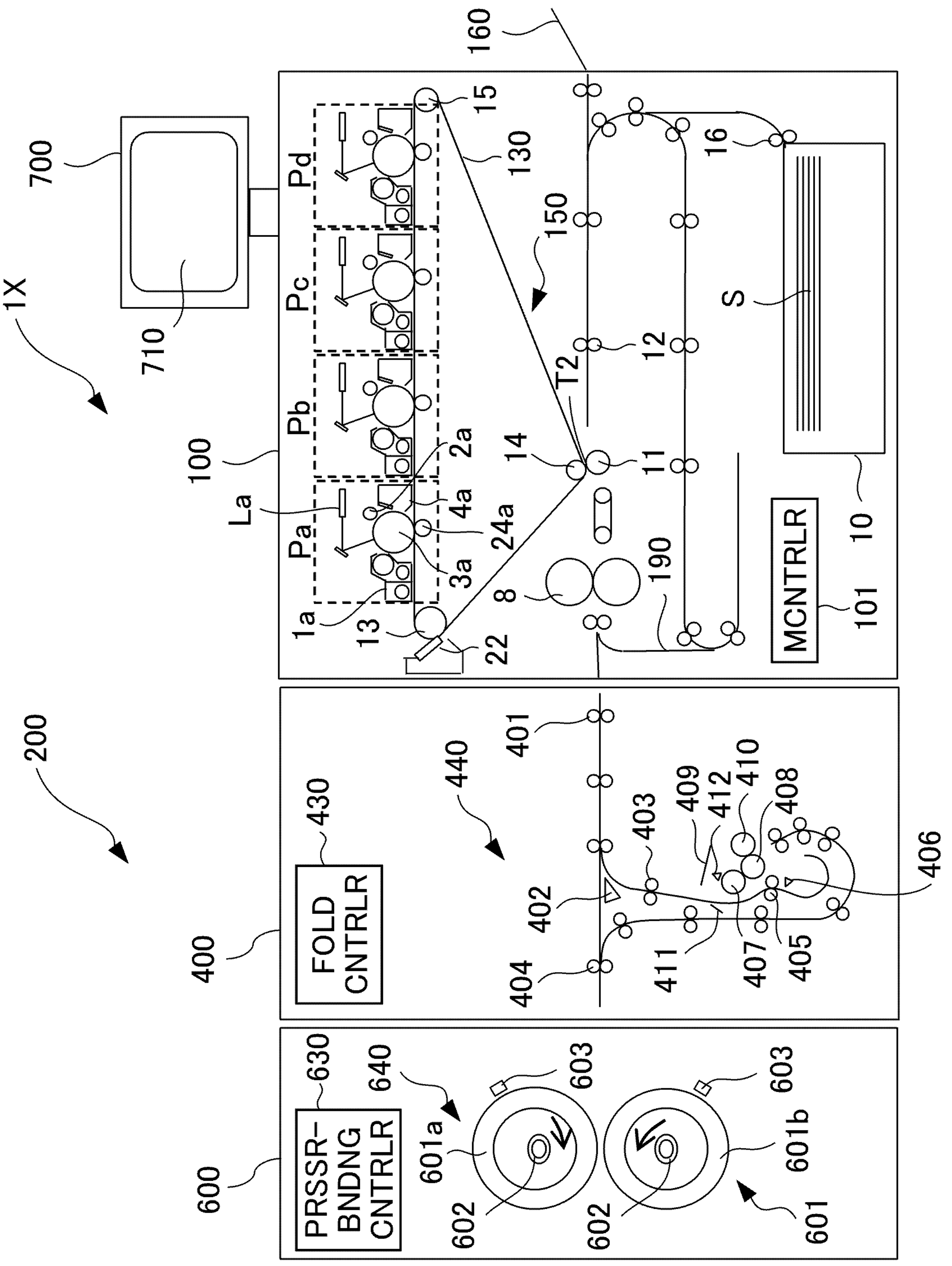
FIG. 1 is a schematic view showing an image forming system.

In FIG. 1, as the pressure-bonding processing apparatus 200, an apparatus including a folding processing apparatus 400, and a pressure-bonding apparatus 600 was shown as an example. The image forming apparatus 100, the folding processing apparatus 400, and the pressure-bonding apparatus 600 are connected to each other by data input/output interfaces (not shown) capable of serial communication or parallel communication so as to be capable of transmitting and receiving control signals and data therebetween.

<Image Forming Apparatus>

The image forming apparatus 100 will be described. The image forming apparatus 100 is an electrophotographic full-color printer of a tandem type. As shown in FIG. 1, the image forming apparatus 100 includes image forming portions Pa, Pb, Pc, and Pd for forming images of yellow, magenta, cyan, and black, respectively. The image forming apparatus 100 forms a toner image on the recording material S on the basis of image forming data sent from an original reading device (not shown) connected to an apparatus main assembly or from an external device (not shown) such as a personal computer or the like connected to the apparatus main assembly so as to be capable of inputting and outputting data.

The image forming data may include, for example, information on a plurality of toner images formed on a first surface side and a second surface side opposite from the first surface side of the recording material S, and in addition, information on a manner of folding (for example, a folding position of the outward three-folding depending on a size of the recording material S) or on pressure-bonding surfaces (surfaces on a valley folding side), and the like information. The information on the toner images includes an image formation order for forming the toner images. Further, the image forming data may include information on a paste surface (also, referred to as an adhesive region or a pressure-bonding surface) where a pressure-bonding paste is applied onto the recording material S.

As shown in FIG. 1, the image forming portions Pa, Pb, Pc, and Pd are juxtaposed along a movement direction of the intermediary transfer belt 130 in the apparatus main assembly of the image forming apparatus 100. The intermediary transfer belt 130 is stretched by a plurality of rollers (13, 14, 15) and is rotated. Then, the intermediary transfer belt 130 carries and feeds a toner image primary-transferred in a manner described later. At a position opposing, through the intermediary transfer belt 130, an inner secondary transfer roller 14 stretching the intermediary transfer belt 130, an outer secondary transfer roller 11 is disposed, so that a secondary transfer portion T2 where the toner image on the intermediary transfer belt 130 is transferred onto the recording material S is formed. On a side downstream of the secondary transfer portion T2 with respect to a recording material feeding direction, a fixing device 8 is provided.

The image forming apparatus 100 includes a cassette 10 in which recording materials S are set. The recording material S is supplied from the cassette 10 toward a registration roller pair 12 by a feeding roller 16. Thereafter, the registration roller pair 12 is started to be rotated in synchronism with the toner image formed on the intermediary transfer belt 130, so that the recording material S is fed toward the secondary transfer portion T2. A plurality of cassettes 10 capable of setting the recording materials S different in size and thickness may be provided, and in that case, the recording material S selected by a user is fed from either one of the plurality of cassettes 10. Further, in the case of this embodiment, the recording material S set on a manual feeding tray 160 is supplied. Incidentally, a constitution in which as an option, an unshown recording material supplying apparatus is connected to the image forming apparatus 100 and in which the recording material set in the recording material supplying apparatus is supplied to the image forming apparatus 100 may be employed.

In the case of this embodiment, the recording material S set in the cassette 10 as a second set portion is turned upside down and then is fed toward the registration roller pair 12. On the other hand, the recording material S set on the manual feeding tray 160 as a first set portion is fed toward the registration roller pair 12 without being turned upside down. Incidentally, there is also a specification, as a specification of the image forming apparatus 100, such that the recording material S set in the cassette 10 is fed toward the registration roller pair 12 without being turned upside down and that the recording material S set on the manual feeding tray 160 is turned upside down and then is fed toward the registration roller pair 12. For example, there is a case of an image forming apparatus of a vertical feeding type, not the image forming apparatus of a horizontal feeding type as in this embodiment.

The four image forming portions Pa, Pb, Pd, and Pd included in the image forming apparatus 100 have a substantially same constitution except that development colors are different from each other. Accordingly, in this embodiment, as a representative, the image forming portion Pa for yellow will be described, and other image forming portions Pb, Pc, and Pd will be omitted from description.

In the image forming portion Pa, a cylindrical photosensitive drum 3*a* is provided as a photosensitive member. The photosensitive drum 3*a* is rotationally driven in a predetermined direction. At a periphery of the photosensitive drum 3*a*, a charging device 2*a*, an exposure device La, a developing device 1*a*, a primary transfer roller 24*a*, and a drum cleaning device 4*a* are provided.

A process for forming, for example, a full-color image by the image forming apparatus 100 will be described. First, when an image forming operation is started, a surface of the rotating photosensitive drum 3*a* is electrically charged uniformly by the charging device 2*a*. The charging device 2*a* is a corona charger or the like for charging the photosensitive drum 3*a* to a uniform negative dark-portion potential by irradiating the photosensitive drum 3*a* with charge particles with corona discharge, for example. Then, the photosensitive drum 3*a* is subjected to scanning exposure to laser light which is emitted from the exposure device La and which corresponds to an image signal. By this, an electrostatic latent image depending on the image signal is formed on the surface of the photosensitive drum 3*a*. The electrostatic latent image formed on the photosensitive drum 3*a* is developed into a toner image which is a visible image by a developer, containing toner and a carrier accommodated in the developing device 1*a*.

In the case of this embodiment, in the developing device 1*a*, as the developer, a two-component developer containing non-magnetic toner and a magnetic carrier is used. The toner contains a binder resin, a colorant, and a parting agent (wax). As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow, magenta, cyan, and black, respectively.

As the parting agent, for example, it is possible to cite aliphatic hydrocarbon wax such as low-molecular weight polyethylene, low-molecular weight olefin copolymer wax, microcrystalline wax, Fischer-Tropsch wax, and paraffin wax; oxide of aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

The toner image formed on the photosensitive drum 3*a* is transferred onto the intermediary transfer belt 130 at a primary transfer portion formed between the intermediary transfer belt 130 and the photosensitive drum 3*a* opposing the primary transfer roller 24*a*. At this time, to the primary transfer roller 24*a*, a primary transfer bias (voltage) is applied. After the transfer on the intermediary transfer belt 130, toner remaining on the surface of the photosensitive drum 3*a* is removed by the drum cleaning device 4*a*.

Such an operation is sequentially performed in the image forming portions Pa, Pb, Pc, and Pd for yellow, magenta, cyan and black, respectively, so that four color toner images are superposed on the intermediary transfer belt 130. Thereafter, in synchronism with toner image forming timing, the recording material S set in the cassette 10 is fed to the secondary transfer portion T2. Then, by applying a secondary transfer bias (voltage) to the outer secondary transfer roller 11, the toner images for a full-color image formed on the intermediary transfer belt 130 are collectively secondary-transferred onto the recording material S. Toner remaining on the intermediary transfer belt 130 after the transfer on the recording material S is removed by a belt cleaning device 22. Incidentally, in the case of this embodiment, an image forming unit portion 150 capable of forming the toner images on the recording material S is constituted by the image forming portions Pa to Pd, the intermediary transfer belt 130, the rollers (13, 14, 15), the outer secondary transfer roller 11, and the like.

The recording material S on which the toner images are formed is fed toward the fixing device 8 as a fixing portion. The fixing device 8 includes a fixing roller and a pressing roller, and at a fixing nip formed by the fixing roller and the pressing roller, the fixing device 8 nips and feeds the recording material S on which the toner image is formed and thus heats and presses the recording material S, so that the toner image is fixed on the recording material S.

The image forming apparatus 100 of this embodiment is capable of performing an operation in a one-side image forming mode in which an image is formed on a first (surface) side of the recording material S, and an operation in a double-side image forming mode in which images are formed on the first side and a second (surface) side opposite from the first side. During the operation in the one-side image forming mode, the recording material S on which the toner image is fixed on the one side by the fixing device 8 is discharged to the pressure-bonding processing apparatus 200. On the other hand, during the operation in the double-side image forming mode, the recording material S on which the toner image is fixed on the one side by the fixing device 8 is fed toward a double-side feeding portion 190. In the double-side feeding portion 190, the recording material S is reversed while being fed, so that the first side and the second side of the recording material S are replaced with each other. Then, the reversed recording material S is fed again toward the registration roller pair 12 through the double-side feeding portion 190. Then, the recording material S is fed by the registration roller pair 12 toward the secondary transfer portion T2 in a state in which the second side thereof where printing has not been carried out faces the intermediary transfer belt 130 side. At the secondary transfer portion T2, the toner images for a full-color image formed on the intermediary transfer belt 130 are collectively secondary-transferred on the second side of the recording material S. Thereafter, the recording material S is subjected to toner image fixing by the fixing device 8 and the recording material S on both surfaces of which the toner images are formed is discharged to the pressure-bonding processing apparatus 200.

Further, the image forming apparatus 100 includes a main controller 101. The main controller 101 as a controller can execute an image forming step for forming the image on the recording material S by controlling the image forming apparatus 100 and can execute a pressure-bonding processing step for folding and pressure-bonding the recording material S by controlling the pressure-bonding processing apparatus 200. A control constitution of the image forming system X will be described later (see FIG. 2).

<Pressure-Bonding Processing Apparatus>

Next, the pressure-bonding processing apparatus 200 will be described. As shown in FIG. 1, the pressure-bonding processing apparatus 200 includes the folding processing apparatus 400, and the pressure-bonding apparatus 600. The folding processing apparatus 400 folds the recording material S, and the pressure-bonding apparatus 600 pressure-bonds the folded recording material S under application of heat and pressure.

<Folding Processing Apparatus>

The folding processing apparatus 400 is an apparatus for performing folding (processing) for folding the recording material S subjected to the image forming step by the image forming apparatus 100. In this embodiment, the folding processing apparatus 400 of a roller press-contact type capable of folding two-folding processing in which a pressure-bonding printed matters for two-folding as the recording material of a pre-paste type is folded once in a V-shape and outward three-folding processing in which a pressure-bonding postcard sheet for outward three-folding is folded twice in a Z-shape was described. The folding processing apparatus 400 includes a folding processing controller 430 and a folding processing portion 440 for folding the recording material S. The folding processing controller 430 principally carries out the folding processing portion 440.

As regards an operation of the folding processing portion 440, the two-fold processing will be described as an example. The recording material S fed from the image forming apparatus 100 is drawn into the folding processing apparatus 400 by an entrance roller pair 401 and is sorted into separate feeding passages by a branch flapper 402 depending on whether or not the folding processing is required to be performed. That is, in the case where the folding processing is performed, the recording material S is sorted into a folding processing passage toward a feeding roller pair 403, and in the case where the folding processing is not performed, the recording material S is sorted into a folding-avoiding passage toward a discharging roller pair 404. In the case where the recording material S is sorted into the folding-avoiding passage, the recording material S is discharged to the pressure-bonding apparatus 600 by the discharging roller pair 404 without being subjected to the two-folding processing.

In the case where the recording material S is sorted into the folding processing passage, the recording material S is subjected to registration correction such that the recording material S is once stopped at a position of a registration roller pair 405 and a loop is formed. The recording material S subjected to the registration correction is fed again, and is drawn by a first folding roller 407 and a second folding roller 408 and passes through a folding position detecting sensor 406, and thereafter, when a trailing end of the recording material S abuts against a trailing end abutment stopper 411, the recording material S is subjected to the folding processing. The recording material S is folded in two in a fold so that the one (surface) side portions oppose each other. At this time, the drawn recording material S is guided by a leading end guide 412 moved to a predetermined position in advance, and thus is drawn by the second folding roller 408 and a third folding roller 410. The recording material S drawn by the second folding roller 408 and the third folding roller 410 is conveyed toward the discharging roller pair 404 and is discharged to the pressure-bonding apparatus 600 by the discharging roller pair 404.

<Pressure-Bonding Apparatus>

The pressure-bonding apparatus 600 is an apparatus for subjecting, to pressure-bonding for pressure-bonding the recording material S, the recording material S subjected to a folding processing step by the above-described folding processing apparatus 400. As an example, the pressure-bonding apparatus 600 of a roller press-contact type capable of pressure-bonding processing of the recording material S by applying heat and pressure to the recording material S through the pressure-bonding roller pair nipping and conveying the recording material S is described. The pressure-bonding apparatus 600 includes a pressure-bonding processing controller 630, and a pressure-bonding portion 640 capable of pressure-bonding the recording material S. The pressure-bonding processing controller 630 principally carries out control of the pressure-bonding portion 640.

The pressure-bonding portion 640 will be described. The pressure-bonding portion 640 includes a pressure-bonding roller pair 601 for nipping and feeding the recording material S by rotation, heaters 602 for heating the pressure-bonding roller pair 601, and thermistors 603 for detecting a temperature of the pressure-bonding roller pair 601. The pressure-bonding roller pair 601 includes an upper roller 601*a* and a lower roller 601*b* which are maintained at desired temperatures by the heaters 602 depending on detection temperatures of the thermistors 603. Further, the pressure-bonding roller pair 601 applies heat and pressure to the recording material S while nipping and feeding the recording material S in a folded state. By this, the recording material S folded so that the paste surface is positioned inside is subjected to pseudo-bonding so as to bond the paste surface together by pressure-bonding paste.

In the pressure-bonding apparatus 600, from the viewpoints of adhesive strength and a re-peeling property of the pressure-bonding printed matter, there is a need to control the temperature and the pressure of the recording material S during the pressure-bonding processing. This is because there is a liability that in the case where the temperature and the pressure are low, the adhesive force of the pressure-bonding paste becomes weak and thus a pseudo-bonding state cannot be maintained when the adhesive force is excessively low. On the other hand, this is because in the case where the temperature and the pressure are high, the adhesive force becomes strong, so that there is a liability that the re-peeling property lowers such that the recording material S is broken during the re-peeling when the adhesive force is excessively high. Therefore, there is a need to appropriately set the temperature and the pressure of the heat applied to the recording material S during the pressure-bonding processing, depending on a kind of the recording material S. For example, the temperature of the pressure-bonding roller pair 601 of the pressure-bonding apparatus 600 is set at "15° C. to 80° C.", preferably "20° C. to 60° C.", and the pressure thereof is set at several MPa or more, so that an appropriate adhesive force of the pressure-bonding paste can be obtained.

Incidentally, although the pressure of the pressure-bonding roller pair 601 is the "several MPa or more", a pressure applied to the recording material S by the fixing device 8 is about "0.1-0.5 MPa". As described above, the pressure-bonding paste, exhibits an adhesive property by exposure of the adhesive base material to the surface under application of a high pressure (several MPa or more), and therefore, in the fixing device 8 low in pressure, the recording material S is in a high-temperature state of "100° C. to 200° C.", but the adhesive base material is not readily exposed to the surface. Accordingly, the adhesive property does not exhibit. Accordingly, the recording material S passed through the fixing device 8 is subjected to the folding processing without being adhered to the folding processing apparatus 400.

<Control Constitution of Image Forming System>

Next, control of the image forming system 1X will be described using FIG. 2 while making reference to FIG. 1. In this embodiment, the case where the image forming apparatus 100 (specifically, the main controller 101) unitarily manages an operation instruction to the pressure-bonding processing apparatus 200 (the folding processing apparatus 400 and the pressure-bonding apparatus 600) and controls these apparatuses will be described as an example. Incidentally, in addition to the devices illustrated in FIG. 2, various devices such as motors and power sources are connected, but are not the main object of the present invention herein, and therefore, will be omitted from illustration and description.

Figure 2:
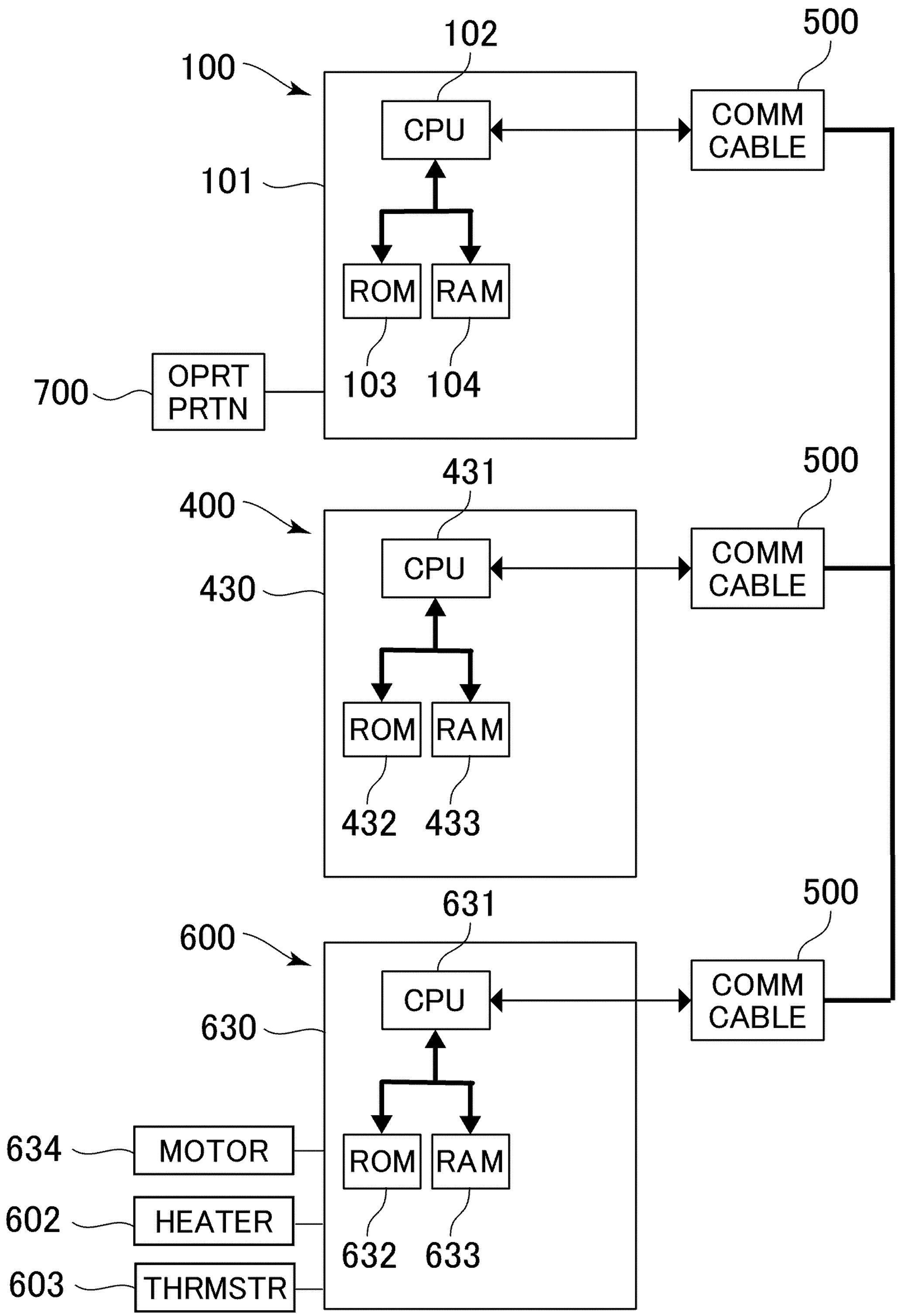
FIG. 2 is a control block diagram showing a control constitution of the image forming system.

In the image forming system 1X of this embodiment, as shown in FIG. 2, to the main controller 101, the folding processing controller 430 and the pressure-bonding processing controller 630 are connected via communication cables 500 so as to be capable of communicating operation instructions and various data. In accordance with the operation instructions from the main controller 101, the folding processing controller 430 causes the folding processing apparatus 400 to operate, and the pressure-bonding processing controller 630 causes the pressure-bonding apparatus 600 to operate. That is, while the main controller 101 controls the operation of the image forming apparatus 100, the main controller 101 is capable of controlling entirety of the image forming system 1X by sending the operation instructions to the pressure-bonding processing apparatus 200 (the folding processing apparatus 400 and the pressure-bonding apparatus 600).

The main controller 101, the folding processing controller 430, and the pressure-bonding processing controller 630 which are described above may have the same constitution. For example, each of the controllers includes a CPU (central processing unit), a ROM (read only memory), and a RAM (random access memory).

The main controller 101 includes the CPU 102, the ROM 103, and the RAM 104. In the ROM 103 and the RAM 104, various programs and various data for "pressure-bonding printed matter preparation processing" (see FIG. 8) described later. Incidentally, the RAM 104 is capable of temporarily storing a calculation (computation) processing result or the like with execution of the various programs.

The image forming apparatus 100 includes an operating portion 700 including, for example, a liquid crystal display portion 710 (see FIG. 1), and the operating portion 700 as an input portion is connected to the main controller 101. The operating portion 700 is capable of displaying, on a liquid crystal display portion 710, various screens presenting the various programs and various data or the like. Further, the operating portion 700 is a touch panel to which the user is capable of inputting information, and receives input of a start of the various programs and input of the various data depending on a user operation such as a touch operation by the user.

The user is capable of inputting a start of an image forming job from the operating portion 700. With this execution, together with the image forming apparatus 100, the pressure-bonding processing apparatus 200 (the folding processing apparatus 400 and the pressure-bonding apparatus 600) is capable of being operated. In this embodiment in the case where the image forming job is inputted, the CPU 102 executes the "pressure-bonding printed matter preparation processing" stored in the ROM 103.

The folding processing controller 430 includes a CPU 431, a ROM 432, and a RAM 433. The CPU 431 causes the folding processing apparatus 400 to operate on the basis of a control program stored in the ROM 432.

The pressure-bonding processing controller 630 includes a CPU 631, a ROM 632, and a RAM 633. The CPU 631 causes the pressure-bonding apparatus 600 to operate on the basis of a control program stored in the ROM 632. To the pressure-bonding processing controller 630, a motor 634 for rotationally driving the pressure-bonding roller pair 601, the heaters 602 for heating the pressure-bonding roller pair 601, and the thermistors 603 for detecting the temperatures of the pressure-bonding roller pair 601 are connected. The pressure-bonding processing controller 630 sends a detection result (temperature data) of the thermistors 603 to the main controller 101. Further, the pressure-bonding processing controller 630 is capable of changing the temperatures of the heaters 602 by receiving a target temperature from the main controller 101. Further, the pressure-bonding processing controller 630 is capable of changing the number of rotations of the motor 634 by receiving a target speed of the feeding recording material S from the main controller 101. Further, the pressure-bonding processing controller 630 is capable of changing the pressure of the pressure-bonding roller pair 601 in accordance with control of the main controller 101.

<Recording Material>

Next, the recording material S will be described. In this embodiment, as the recording material S, the recording material S of the pre-paste type including a base material and an adhesive layer. As the base material, a base material capable of forming the adhesive layer on at least one surface (side) thereof may only be required, and it is possible to cite high-quality paper, medium-quality paper, coated paper, and the like, for example. Further, from a viewpoint of confidentiality of information, it is desirable that the base material does not permit light transmission and thus the toner image formed on one side is not readily seen through the recording material S on the other side.

The adhesive layer is formed by applying the pressure-bonding paste on the recording material S, and the pressure-bonding paste contains an adhesive base material and an adhesive force adjusting agent. As the adhesive base material, a composition in which, for example, natural rubber latex or a modified product thereof, synthetic rubber wax, synthetic resin, and the like are compounded is used, and the composition exhibits an adhesive force as a pressure-sensitive adhesive which is pseudo-bonded by pressure application. The adhesive force adjusting agent is a well-known wax such as paraffin wax, or a fine-particle filler formed of silica, titanium oxide, calcium carbonate, or the like. Either one of these materials is low in affinity for the adhesive base material and is used for adjusting the adhesive force of the adhesive base material.

The filler contained in the adhesive base material projects from the adhesive base material, so that an uneven shape is formed on a surface of the adhesive layer. By this uneven shape, the adhesive base material is not exposed to the surface of the adhesive during non-pressure application, and therefore, the adhesive does not exhibit the adhesive force. On the other hand, when surfaces on which the adhesive layer is applied are superposed on and pressed by each other, the adhesive base material positioned under the uneven portion is exposed to the surface of the adhesive, and therefore, contacts the adhesive base material or the adhesive force adjusting agent on the opposite surface, so that the adhesive exhibits the adhesive force. Incidentally, when a point such that the pressure-bonding postcard is more inexpensive in transportation cost such as postage than an envelope is taken into consideration, it is desirable that a basis weight of the recording material S of the pre-paste type is for example, "64 g/$m^2$ to 209 g/$m^2$".

<Pressure-Bonding Postcard Sheet for Two-Folding>

As an example of the recording material S, a pressure-bonding postcard sheet for two-folding will be described using parts (a) and (b) of FIG. 3. Part (a) of FIG. 3 shows a first side (surface) of the pressure-bonding postcard sheet for the two-folding, and part (b) of FIG. 3 shows a second side (surface) of the pressure-bonding postcard sheet for the two-folding.

The pressure-bonding postcard sheet for the two-folding (recording material S) has a front/back constitution including a paste surface 810, shown in part (a) of FIG. 3, onto which the pressure-bonding paste is applied and a non-paste surface 820, shown in part (b) of FIG. 3, onto which the pressure-bonding paste is not applied. Specifically, a back surface of a first region 801 is a fourth region 804, and a back surface of a second region 802 is a third region 803. The pressure-bonding postcard sheet is subjected to the two-folding by valley folding at a position of a fold Sa1 between the first region 801 and the second region 802 on the paste surface 810, for example. In this case, there is a need that an image of secret information such as personal information is formed on the paste surface 810 (first region 801, second region 802) and that an image of a non-secret information such as an address is formed on the non-paste surface 820 (third region 803, fourth region 804).

In the image forming apparatus 100, the pressure-bonding postcard sheet is supplied from the cassette 10 or the manual feeding tray 160 (see FIG. 1). Then, the image is formed on the paste surface 810, and thereafter, the pressure-bonding postcard sheet is discharged from the image forming apparatus 100 to the pressure-bonding processing apparatus 200. In the case of this embodiment, there is a need that in order to perform valley folding such that the paste surface 810 of the recording material S is disposed inside in the folding processing apparatus 400, the user sets the pressure-bonding postcard sheet at the cassette 10 or the manual feeding tray 160 in a set mode such that the recording material S is discharged from the image forming apparatus 100 in a state in which the paste surface 810 is facing upward.

In the case of this embodiment, when the paste surface 810 is set upward in the cassette 10 during an operation of a double-side image forming mode, the recording material S is discharged in the state in which the paste surface 810 is facing upward, and then is subjected to the valley folding with the paste surface 810 inward in the folding processing apparatus 400. Or, in the case where the paste surface 810 is set downward in the cassette 10 during the operation in the one-side image forming mode, the recording material S is discharged in the state in which the paste surface 810 is facing upward, and then is subjected to the valley folding with the paste surface 810 inward in the folding processing apparatus 400.

Further, in the case where the recording material S is set on the manual feeding tray 160 in a state in which the paste surface 810 is facing downward during the operation in the double-side image forming mode, the recording material S is discharged from the image forming apparatus 100 in a state in which the paste surface 810 is facing upward, and then is subjected to valley folding in a state in which the paste surface 810 is disposed inside in the folding processing apparatus 400. Or, in the case where the recording material S is set on the manual feeding tray 160 in a state in which the paste surface 810 is facing upward during an operation in the one-side image forming mode, the recording material S is discharged from the image forming apparatus 100 in the state in which the paste surface 810 is facing upward, and then is subjected to the valley folding in a state in which the paste surface 810 is disposed inside in the folding processing apparatus 400.

Thus, in order to prepare an appropriate pressure-bonding postcard, the user needs to change the set mode of the pressure-bonding postcard sheet depending on whether a set position (place) is the cassette 10 or the manual feeding tray 160. However, as regards the folding processing apparatus 400, although illustration is omitted, there is also a specification such that the pressure-bonding postcard sheet is subjected to two-folding processing by mountain folding. In that case, the pressure-bonding postcard sheet is discharged from the image forming apparatus 100 in the state in which the paste surface 810 is facing downward, so that the pressure-bonding postcard sheet is subjected to the mountain folding in a state in which the paste surface 810 is disposed inside in the folding processing apparatus 400.

<Set Mode>

Next, a proper set mode of the pressure-bonding postcard sheet for the two-folding will be described. FIG. 4 shows combinations of set modes of pressure-bonding postcard sheets for two-folding depending on a specification of the image forming apparatus 100 and a specification of the folding processing apparatus 400. In FIG. 4, a "FOLDING DIRECTION" of the folding processing apparatus 400 shows that the pressure-bonding postcard sheet is folded in the folding processing apparatus 400 by which one of the valley folding and the mountain folding and that the pressure-bonding postcard sheet is fed in the state in which the paste surface 810 is facing upward during the valley folding and is fed in a state in which the non-paste surface 820 is facing upward during the mountain folding. A "FEEDING DIRECTION (FOLD POSITION)" of the folding processing apparatus 400 shows that when the pressure-bonding postcard sheet is fed from the folding processing apparatus 400 to the pressure-bonding apparatus 600, the fold Sa1 is positioned on a leading end (front) or a trailing end side (rear) with respect to the feeding direction.

Further, a "DISCH (discharge) DIRECTION" is shown by "FACE UP" in a state in which the surface of the recording material S set in the set position of the image forming apparatus 100 is facing upward, i.e., in the case where the recording material S is discharged from the image forming apparatus 100 without being reversed, and is shown by "FACE DOWN" in a state in which the surface of the recording material S set in the set position is facing downward, i.e., in the case where the recording material S is reversed and discharged from the image forming apparatus 100. A "SET DIRECTION" of the image forming apparatus 100 is a proper set mode of the pressure-bonding postcard sheet in a set position (for example, the cassette 10 or the manual feeding tray 160) where the "DISCH DIRECTION" of the image forming apparatus 100 is "FACE UP" or "FACE DOWN" during an operation in any image forming mode.

"E1" shows that the pressure-bonding postcard sheet is set as "SET DIRECTION is a paste surface (PS): UP" in the case where "FOLDING DIRECTION is VF (valley-folding)" and "FEEDING DIRECTION is FDLE (feeding direction leading end)" side as the specification of the folding processing apparatus 400 and "DISCH DIRECTION is FACE UP" as the specification of the image forming apparatus 100. "E2" shows that the pressure-bonding postcard sheet is set as "SET DIRECTION is PS: DOWN" in the case where "FOLDING DIRECTION is VF" and "FEEDING DIRECTION is FDTE (feeding direction trailing end)" side as the specification of the folding processing apparatus 400 and "DISCH DIRECTION is FACE DOWN" as the image forming apparatus 100. "E3" shows that the pressure-bonding postcard sheet is set as "SET DIRECTION is PS: DOWN" in the case where "FOLDING DIRECTION is MF (mountain-folding)" and "FEEDING DIRECTION is FDLE (feeding direction leading end)" side as the specification of the folding processing apparatus 400 and "DISCH DIRECTION is FACE UP" as the specification of the image forming apparatus 100. "E4" shows that the pressure-bonding postcard sheet is set as "SET DIRECTION is PS: UP" in the case where "FOLDING DIRECTION is MF" and "FEEDING DIRECTION is FDTE (feeding direction trailing end)" side as the specification of the folding processing apparatus 400 and "DISCH DIRECTION is FACE DOWN" as the image forming apparatus 100.

As described above, depending on the specification of the image forming apparatus 100 and the specification of the folding processing apparatus 400, the set mode of the pressure-bonding postcard sheet for the two-folding in the set position of the image forming apparatus 100 is determined. Here, as regards the pressure-bonding postcard sheet for the two-folding, a preparation of the pressure-bonding postcard in the case where an image formation order of the image forming data and a set mode of the recording material coincide with each other and a preparation example of the pressure-bonding postcard in the case where the image formation order of the image forming data and the set mode of the recording material do not coincide with each other is shown in FIG. 5. In the examples shown in FIG. 5, a "sun mark" and a "face mark" are secret information images, and a "cloud mark" and an "address surface" are non-secret information images. Incidentally, in FIG. 5, a region enclosed by a broken-line frame represents the paste surface on which the pressure-bonding paste is applied.

In a lower stage of FIG. 5, the case where data for forming images are defined in an order of the "sun mark" and the "face mark" on the first side, and the "cloud mark" and the "address surface" on the second side, as the image formation order of the image forming data which coincides with the set mode of the recording material S is shown. In this case, for example, when the pressure-bonding postcard sheet is set in the cassette 10 in the set direction (E3, PS: DOWN) shown in FIG. 4 during the operation in the double-side image forming mode, a pressure-bonding postcard such that the secret information images are formed on the paste surface (first side) on the basis of the image forming data is prepared.

In an upper stage of FIG. 5, the case where data for forming images are defined in an order of the "cloud mark" and the "address surface" on the first side, and the "sun mark" and the "face mark" on the second side, as the image formation order of the image forming data which does not coincide with the set mode of the recording material S is shown. In this case, for example, even when the pressure-bonding postcard sheet is set in the cassette 10 in the set direction (E3, PS: DOWN) shown in FIG. 4 during the operation in the double-side image forming mode, a pressure-bonding postcard such that the secret information images are formed on the paste surface (first side) on the basis of the image forming data is prepared. Therefore, in the conventional case, the user has to check whether or not the appropriate pressure-bonding postcard is prepared by expressly performing test printing, and thus the preparation of the appropriate pressure-bonding postcard taken time and became troublesome.

<Pressure-Bonding Print Preparation Processing>

Next, "Pressure-bonding print preparation processing" in this embodiment will be described using FIG. 6 to part (b) of FIG. 8 while making reference to FIGS. 1 and 2. The "pressure-bonding printed matter preparation processing" in this embodiment is started by the main controller 101 with the input or a start of the "image forming job" from the operating portion 700 and is ended with an end of the "image forming job".

As shown in FIG. 6, the main controller 101 discriminates whether or not the "image forming job" inputted from the operating portion 700 is a job for preparing the pressure-bonding printed matter (S1). Whether or not the job is the job for preparing the pressure-bonding printed matter is discriminated on the basis of a kind of the recording material S inputted from the operating portion 700.

For example, when the inputted kind of the recording material S is "pressure-bonding postcard", the job is discriminated as the job for preparing the pressure-bonding printed matter. Incidentally, from the operating portion 700, whether to prepare the pressure-bonding printed matter in the operation in the double-side image forming mode or in the operation in the one-side image forming mode may be inputted. Or, in the case where the pressure-bonding printed matter is prepared, the operation in the double-side image forming mode may be automatically executed.

In the case where the job is not the job for preparing the pressure-bonding printed matter (NO of S1), the main controller 101 controls the image forming apparatus 100, so that the image is formed on the recording material S (S2). In this case, the main controller 101 does not send an operation instruction for the pressure-bonding processing apparatus 200 to the folding processing controller 430 and the pressure-bonding processing controller 630 while controlling the operation of the image forming apparatus 100. Therefore, although the image is formed on the recording material S, the pressure-bonding processing of the recording material S is not carried out, so that the recording material S on which the image is formed is only prepared, and the pressure-bonding printed matter is not prepared.

Incidentally, in the case where the job is not the job for preparing the pressure-bonding printed matter, the set position of the recording material S is inputted from the operating portion 700 by the user, and then the recording material S is supplied from the inputted set position (the cassette 10 or the manual feeding tray 160).

In the case where the job is the job for preparing the pressure-bonding printed matter (YES of S1), the main controller 101 executes an operation in a preparation mode for preparing the pressure-bonding printed matter. First, the main controller 101 discriminates whether or not a "SHEET (FEEDING) SETTING" of the recording material S for preparing the pressure-bonding printed matter is made (S3). The "SHEET SETTING" maintained herein is the set position of the recording material S and the set mode of the recording material S. The set position of the recording material S is, for example, the cassette 10, the manual feeding tray 160, and the like, and is inputted from the operating portion 700 by the user.

In the case where the "SHEET SETTING" is not made, the main controller 101 causes the liquid crystal display portion 710 to display the "setting screen", and prompts the user to input the "SHEET SETTING" (S4). Then, when the "SHEET SETTING" is inputted from the setting screen, the main controller 101 causes the ROM 103 or the RAM 104 to store the inputted "SHEET SETTING". This input of the "SHEET SETTING" is repeated until, for example, an "OK" button is operated in the setting screen by the user.

An example of the "setting screen" is shown in FIG. 7. In FIG. 7, the case where the pressure-bonding printed matters for the two-folding is selected as the kind of the recording material S is shown as an example. Therefore, as shown in FIG. 7, in the "setting screen", display is made so that the user can understand that a "KIND OF FOLDING" is "TWO FOLD" (the two-folding).

In the "setting screen", display is made so that the user can understand the "DISCH DIRECTION" of the image forming apparatus 100.

In the case of this embodiment, the "DISCH DIRECTION" of the image forming apparatus 100 is determined by the set position of the recording material S inputted from the operating portion 700 and the operation in the double-side or one-side image forming mode.

For example, in the case where the set position of the recording material S is the "manual feeding tray 160" and the image forming mode is the double-side image forming mode, the discharging direction ("DISCH DIRECTION") is determined as "FACE DOWN". In the case where the set position of the recording material S is the "manual feeding tray 160" and the image forming mode is the one-side image forming mode, the discharging direction is determined as "FACE UP".

In the case where the set position of the recording material S is the "cassette 10" and the image forming mode is the double-side image forming mode, the discharging direction is determined as "FACE UP". In the case where the set position of the recording material S is the "cassette 10" and the image forming mode is the one-side image forming mode, the discharging direction is determined as "FACE DOWN".

Further, in the "setting screen", the "SHEET SET DIRECTION" of the image forming apparatus 100 is display in a selectable manner. In the case of the "two-folding", the user is capable of selectively inputting either one of "PS:UP" and "PS:DOWN" as the "SHEET SET DIRECTION". Selection items of the "SHEET SET DIRECTION" of the image forming apparatus 100 is in accordance with the specification of the image forming apparatus 100 (see FIG. 4). For that reason, in the case where the pressure-bonding postcard sheet for the two-folding is selected as the kind of the recording material S, the selection items of the "SHEET SET DIRECTION" are the "PS:UP" and the "PS:DOWN". Further, in the case of this embodiment, in the "setting screen", "page positions" (P1 to P4) for forming the "address surface" on the pressure-bonding postcard sheet are displayed in a selectable manner.

In the "setting screen", the "FEEDING DIRECTION" and the "FOLDING DIRECTION" of the folding processing apparatus 400 are displayed. In the case where the specification of the pressure-bonding processing apparatus 200 is acquired from the pressure-bonding processing apparatus 200, the "FEEDING DIRECTION" and the "FOLDING DIRECTION", are displayed in accordance with the acquired specification. Incidentally, in the case where the specification cannot be acquired from the folding processing apparatus 400, the "FEEDING DIRECTION" and the "FOLDING DIRECTION" may be made capable of being selectively inputted by the user.

The user takes the specification of the folding processing apparatus 400 into consideration in the case where the pressure-bonding printed matter for the two-folding is prepared, and is capable of selecting the "FDLE" and "FDTE" as the "FEEDING DIRECTION" and capable of selecting the "FDVF" and "FDMF" as the "FOLDING DIRECTION".

Returning to FIG. 6, in the case where the "SHEET SETTING" is made (YES of S3), the main controller 101 prepares a completion image of the pressure-bonding printed matter on the basis of the image forming data sent from the original reading apparatus, the set "SHEET SETTING", and the acquired or inputted specification of the folding processing apparatus 400, and then causes the liquid crystal display portion 710 to display a "pressure-bonding printed matter selecting screen" including the prepared completion image (S5).

In each of parts (a) and (b) of FIG. 8, an example of the "pressure-bonding printed matter selecting screen" is shown. Part (a) of FIG. 8 shows the "pressure-bonding selecting screen" displayed in the case where the image formation order of the image forming data and the set mode of the recording material S coincide with each other (see the lower stage of FIG. 5). Part (b) of FIG. 8 shows the "pressure-bonding printed matter selecting screen" displayed in the case where the image formation order of the image forming data and the set mode of the recording material S do not coincide with each other (see the upper stage of FIG. 5). Further, in this embodiment, as described later, the image formation order of the image forming data is changed in some instances (see S7 of FIG. 6), and part (a) of FIG. 18 also shows the "pressure-bonding printed matter selecting screen" before the change in image formation order, and part (b) of FIG. 8 also shows the "pressure-bonding printed matter selecting screen" after the change in image formation order.

As shown in each of parts (a) and (b) of FIG. 18, in the "pressure-bonding printed matter selecting screen", a non-paste surface image, before folding processing, including images formed on the non-paste surface on the basis of the image forming data, a paste surface image, before the folding processing, including images formed on the pressure-bonding surface (paste surface) on the basis of the image forming data, and a completion image of the pressure-bonding printed matter after the folding processing are displayed. In the case where the image formation order of the image forming data and the set mode of the recording material S coincide with each other, as shown in part (a) of FIG. 8, the "sun mark" and the "face mark" which are secret information images are displayed on the paste surface, and the "cloud mark" and the "address surface" which are non-secret information images are displayed on the non-paste surface. Further, an "EXECUTE PRINT & PROCESSING" button and a "CANCEL PRINT" button which have functions described later are displayed. One of the non-paste surface image and the paste surface image corresponds to a first image, and the other image corresponds to a second image.

On the other hand, in the case where the image formation order of the image forming data and the set mode of the recording material S do not coincide with each other, as shown in part (b) of FIG. 8, the "cloud mark" and the "address surface" which are the non-secret information images are displayed on the paste surface, and the "sun mark" and the "face mark" which are the non-secret information images are displayed on the non-paste surface. Further, the "EXECUTE PRINT & PROCESSING" button, the "CANCEL PRINT" button, and a "CORRECT" button which have functions described later are displayed.

Returning to FIG. 6, the main controller 101 discriminates whether or not a "print processing execution" instruction was provided (S6). The user is capable of providing the "print processing execution" instruction by operating the "EXECUTE PRINT & PROCESSING" button in the "pressure-bonding printed matter selecting screen". In the case where the "print processing execution" instruction was provided (YES of S6), the main controller 101 controls the image forming apparatus 100 to form the images on the recording material S (S9). In this case, the main controller 101 sends an operation instruction for the pressure-bonding processing apparatus 200 to the folding processing controller 430 and the pressure-bonding processing controller 630 while controlling the operation of the image forming apparatus 100. That is, the "EXECUTE PRINT & PROCESSING" button is operated, whereby execution of the pressure-bonding processing of the recording material S by the pressure-bonding processing apparatus 200 is permitted. In the case where the execution of the pressure-bonding processing of the recording material S by the pressure-bonding processing apparatus 200 is permitted, a series of processes from the formation of the image on the recording material S to the pressure-bonding of the recording material S by the image forming apparatus 100 and the pressure-bonding processing apparatus 200 are carried out, so that the pressure-bonding printed matter is prepared. Incidentally, in the case of this embodiment, even when the image formation order of the image forming data and the set mode of the recording material S do not coincide with each other, the user is caused to be capable of preparing the pressure-bonding printed matter by operating the "EXECUTE PRINT & PROCESSING" button.

In the case where the "print processing execution" instruction is not provided (NO of S6), the main controller 101 discriminates whether or not a "cancel" instruction of the pressure-bonding printed matter preparation job is provided (S7). For example, in the case where a completion image displayed on the "pressure-bonding printed matter selecting screen" is not a desired image, the user is capable of providing the "cancel" instruction of the pressure-bonding printed matter preparation job by operating a "CANCEL PRINT" button of the "pressure-bonding printed matter selecting screen". In the case where the "cancel" instruction is provided (YES of S7), the main controller 101 ends the pressure-bonding printed matter preparation job without carrying out the formation of the image on the recording material S and the pressure-bonding processing of the recording material S. In this case, in the image forming apparatus 100, supply of the recording material S from the set position is not made originally.

In the case where the "print processing execution" instruction and the "cancel" instruction are not provided (NO of both S6 and S7), the main controller 101 regards the "CORRECT" button of the "pressure-bonding printed matter selecting screen" as being operated, and changes the image formation order of the toner images in the image forming data on the basis of the "SHEET SETTING" (S8). In the case of this embodiment, the pressure-bonding postcard can be properly prepared by replacing the image formation order of the secret information images on the second side with the image formation order of the non-secret information images on the first side in the image forming data so that the secret information images are formed on the first side and the non-secret information images are formed on the second side. For example, in the case of the example shown in the upper stage of FIG. 5, the image formation order of the image forming data is replaced so that the secret information images (the sun mark and the face mark) are formed on the first side changed from the second side and so that the non-secret information images (the cloud mark and the address surface) are formed on the second side changed from the first side.

Thereafter, the main controller 101 causes the image forming apparatus 100 to prepare the completion image of the pressure-bonding printed matter on the basis of the image forming data after the change in image formation order, and causes the liquid crystal display portion 710 to display the "pressure-bonding printed matter selecting screen" including the prepared completion image (S5). By this, the display of the liquid crystal display portion 710 is changed from the "pressure-bonding printed matter selecting screen" shown in part (b) of FIG. 8 to the "pressure-bonding printed matter selecting screen" shown in part (a) of FIG. 8. Thereafter, the main controller 101 repeats the processes of the above-described steps S5 to S8.

Incidentally, in the case where the "EXECUTE PRINT & PROCESSING" instruction is provided, the main controller 101 controls the image forming apparatus 100 to form the images on the recording material S on the basis of the image forming data after the change in image formation order (S9).

When the "pressure-bonding printed matter selecting screens" shown in parts (a) and (b) of FIG. 8 are compared with each other, the "sun mark" and the "face mark" which are the secret information images formed on the non-paste surface before the change are formed on the paste surface, and the "cloud mark" and the "address surface" which are the non-secret images formed in the paste surface before the change is formed on the non-paste surface. This is the same as the case where the image formation order of the image forming data and the set mode of the recording material S coincide with each other as shown in the lower stage of FIG. 5. That is, this means that after the image formation order of the toner images in the image forming data, the pressure-bonding postcard such that the secret information images are formed on the paste surface is prepared.

As described above, in this embodiment, during execution of the operation in the preparing mode for preparing the pressure-bonding printed matter, in the case where the image formation order of the secret information images and the non-secret information images in the image forming data, and the set mode of the recording material set by the user do not coincide with each other, the "pressure-bonding printed matter selecting screen" including the completion image of the pressure-bonding printed matter changed in image formation order is displayed at the liquid crystal display portion 710.

By this, even when the user sets the set mode S of the recording material S erroneously, so that there is no preparation of improper pressure-bonding printed matter such that the paste surface thereof is exposed to the surface thereof. Accordingly, the user needs not check whether or not the user erroneously sets the set mode of the recording material S, by taking the trouble to make trail printing as in the conventional manner, so that the user can efficiently prepare the pressure-bonding printed matter without trouble. Further, even in the case where the set mode of the recording material S is correct but the image formation order of the image forming data is incorrect, the images are formed on the basis of the image forming data changed in image formation order, so that the user can prepare an appropriate pressure-bonding printed matter without correct the image formation order of the image forming data.

[Another Embodiment]

Incidentally, in the above-described embodiment, the case where the two-folding is performed using the pressure-bonding postcard sheet for the two-folding as the pressure-bonding printed matter was described as an example, but the case where the outward three-folding is performed using the pressure-bonding postcard sheet for the outward three-folding may also be made similar thereto. In the following the case of the outward three-folding will be described using part (a) of FIG. 9 to FIG. 13 while making reference to FIGS. 6 and 7. First, the outward three-folding by the folding processing portion 440 of the folding processing apparatus 400 will be described. Incidentally, description which is the same as the description of the case of the two-folding will be simplified or omitted.

First, the outward three-folding by the folding processing portion 440 of the folding processing apparatus 400 will be described. As shown in FIG. 1, in the case where the recording material S is sorted into the folding processing passage, the recording material S is once stopped in the position of the registration roller pair 405, and a loop is formed, so that the registration correction is made. The recording material S subjected to the registration correction is fed again is subjected to first folding processing simultaneously with drawing by the first folding roller 407 and the second folding roller 408 at a predetermined timing after passing through the folding position detecting sensor 406. Then, when the drawn recording material S abuts against a folding abutment stopper 409, the recording material S is subjected to second folding processing simultaneously with drawing by the second folding roller 408 and the third folding roller 410. Thus, the recording material S is folded in a first fold on the first side so that opposing surfaces on the first side oppose each other and is folded in a second fold on the second side so that opposing surfaces on the second side opposite each other. Then, the recording material S subjected to the second folding processing is fed toward the discharging roller pair 404 and then is delivered to the subsequent pressure-bonding apparatus 600 by the discharging roller pair 404. Incidentally, in the case where the recording material S is sorted into the folding avoiding passage, the recording material S is delivered to the subsequent pressure-bonding apparatus 600 by the discharging roller pair 404 without being subjected to the above-described outward three-folding.

<Pressure-Bonding Postcard Sheet for Outward Three-Folding>

As an example of the recording material S, a pressure-bonding postcard sheet for outward three-folding will be described using parts (a) and (b) of FIG. 9. Part (a) of FIG. 9 shows a first side (surface) of the pressure-bonding postcard sheet for the outward three-folding, and part (b) of FIG. 9 shows a second side (surface) of the pressure-bonding postcard sheet for the outward three-folding. On the pressure-bonding postcard sheet for the outward three-folding (recording material S) the pressure-bonding paste is applied onto a second region 902 and a third region 903 on a first side 830 and onto a fourth region 904 and a fifth region 905 on a second side 840, and the pressure-bonding paste is not applied onto a first region 901 on the first side 830 and a sixth region 906 on the second side 840. A front back relationship of the pressure-bonding postcard sheet is such that a back surface of the first region 901 is the fourth region 904, a back surface of the second region 902 is the fifth region 905, and a back surface of the third region 903 is the sixth region 906. On the pressure-bonding postcard sheet, a first paste surface is formed by applying the pressure-bonding paste so as to extend over the second region 902 and the third region 903, and a second paste surface is formed by applying the pressure-bonding paste so as to extend over the fourth region 904 and the fifth region 905. Accordingly, there is a need that an image of secret information such as personal information is formed on the first paste surface (902, 903) and the second paste surface (904. 905) and that an image of a non-secret information such as an address is formed on the non-paste surface 820 (first region 901, sixth region 906).

The pressure-bonding postcard sheet for the outward three-folding is subjected to the outward three-folding by mountain-folding the pressure-bonding postcard sheet at a position of a fold Sb1 between the first region 901 and the second region 902 (parts (a) and (b) of FIG. 10) and then by valley-folding the pressure-bonding postcard sheet at a position of a fold Sb2 between the second region 902 and the third region 903 (part (c) of FIG. 10) (part (d) of FIG. 10). That is, on the second side, a fold Sc1 which is a back side of the fold Sb1 becomes a valley fold, and a fold Sc2 which is a back side of the fold Sb2 becomes a mountain fold. The fold Sc2 is positioned between the fourth region 904 and the fifth region 905. The fold Sc1 is positioned between the fifth region 905 and the sixth region 906. In the case of this embodiment, the pressure-bonding postcard sheet set in the cassette 10 is, as shown in part (d) of FIG. 10, discharged from the folding processing apparatus 400 to the pressure-bonding apparatus 600 in a folding direction such that the first region 901 which is the non-paste surface on the first side 830 is the front surface and the fold Sb2 side is the leading end side with respect to the recording material feeding direction (corresponding to F1 of FIG. 11).

<Set Mode>

Even in the case where the pressure-bonding postcard sheet for the outward three-folding is used, in order to prepare an appropriate pressure-bonding postcard, the user needs to change the set mode of the pressure-bonding postcard sheet depending on whether a set position (place) is the cassette 10 or the manual feeding tray 160. FIG. 11 shows combinations of set modes of pressure-bonding postcard sheets for outward three-folding depending on a specification of the image forming apparatus 100 and a specification of the folding processing apparatus 400.

In FIG. 11, a "FOLDING DIRECTION" of the folding processing apparatus 400 shows that the pressure-bonding postcard sheet is folded in the folding processing apparatus 400 by which one of the Z folding and the reverse Z folding and that the pressure-bonding postcard sheet is fed in which one of states in which the first paste surface (902, 903) or the second paste surface (904, 905) is the leading end or the trailing end during the Z-folding or the reverse Z-folding. A "FEEDING DIRECTION (FOLD POSITION)" of the folding processing apparatus 400 shows that when the pressure-bonding postcard sheet is discharged from the folding processing apparatus 400 to the pressure-bonding apparatus 600, the fold Sb1 is positioned on a leading end side (front) or a trailing end side (rear) with respect to the feeding direction.

Further, a "DISCH (discharge) DIRECTION" is shown by "FACE UP" in a state in which the surface (first side 830 or second side 840) of the recording material S set in the set position of the image forming apparatus 100 is facing upward, i.e., in the case where the recording material S is discharged from the image forming apparatus 100 without being reversed, and is shown by "FACE DOWN" in a state in which the surface (first side 830 or second side 840) of the recording material S set in the set position is facing downward, i.e., in the case where the recording material S is reversed and discharged from the image forming apparatus 100.

A "SET DIRECTION" of the image forming apparatus 100 is a proper set mode of the pressure-bonding postcard sheet in a set position (for example, the cassette 10 or the manual feeding tray 160) where the "DISCH DIRECTION" of the image forming apparatus 100 is "FACE UP" or "FACE DOWN" and where a "FOLDING DIRECTION" of the folding processing apparatus 400 is "FDLE or "FDTE". In the image forming system 1X shown in FIG. 1, for example, when a pressure-bonding postcard for the Z-folding is prepared in either one of the operation in the double-side image forming mode and the operation in the one-side image forming mode, there is a need to set the pressure-bonding postcard sheet so that the "SET DIRECTION" is "PSLE" in the case where the pressure-bonding postcard sheet is set in the cassette 10, and there is a need to set the pressure-bonding postcard sheet so that the "SET DIRECTION" is "PSLE" in the case where the pressure-bonding postcard sheet is set in the manual feeding tray 160. When a pressure-bonding postcard for the reverse Z-folding is prepared, in order to set the pressure-bonding postcard sheet in the cassette 10 or on the manual feeding tray 160.

"F1" shows that the pressure-bonding postcard sheet is set as "SET DIRECTION is PSLE" in the case where "FOLDING DIRECTION is FDZF" and "FEEDING DIRECTION is FDTE" side as the specification of the folding processing apparatus 400 and "DISCH DIRECTION is FACE UP" as the specification of the image forming apparatus 100. "F2" shows that the pressure-bonding postcard sheet is set as "SET DIRECTION is PSLE" in the case where "FOLDING DIRECTION is FDZF" and "FEEDING DIRECTION is FDTE" side as the specification of the folding processing apparatus 400 and "DISCH DIRECTION is FACE DOWN" as the image forming apparatus 100. "F3" shows that the pressure-bonding postcard sheet is set as "SET DIRECTION is a paste surface: DOWN" in the case where "FOLDING DIRECTION is FDRZF" and "FEEDING DIRECTION is FDLE" side as the specification of the folding processing apparatus 400 and "DISCH DIRECTION is FACE UP" as the specification of the image forming apparatus 100. "F4" shows that the pressure-bonding postcard sheet is set as "SET DIRECTION is PS: UP" in the case where "FOLDING DIRECTION is FDRZF" and "FEEDING DIRECTION is FDLE" side as the specification of the folding processing apparatus 400 and "DISCH DIRECTION is FACE DOWN" as the image forming apparatus 100.

Also, in the case of using the above-described pressure-bonding postcard sheet for the outward three-folding, when the image formation order of the image forming data and the set mode of the recording material S do not coincide with each other, the appropriate pressure-bonding printed matter is not readily prepared. Therefore, in the conventional case, the user has to check whether or not the appropriate pressure-bonding postcard is prepared by expressly performing test printing, and thus the preparation of the appropriate pressure-bonding postcard taken time and became troublesome.

<Pressure-Bonding Printed Matter Preparation Processing>

Therefore, in this embodiment, also in the case where the pressure-bonding postcard sheet for the outward three-folding is used, the above-described "pressure-bonding printed matter preparation processing" (see FIG. 6) is executed similarly as in the case where the pressure-bonding postcard sheet for the two-folding is used. In the following, a difference in constitution from the case of the above-described pressure-bonding postcard sheet for the two-folding will be principally described.

Also, in the case where the pressure-bonding postcard sheet for the outward three-folding is used, the user makes the "SHEET SETTING" from the "setting screen" as shown in FIG. 7 (S4 of FIG. 6). In the "setting screen", the "DISCH DIRECTION" of the image forming apparatus 100 is displayed so as to be understood by the user. Further, in the case where the pressure-bonding postcard sheet for the outward three-folding is used, the user is capable of selectively inputting either one of "PSTE" and "PSLE" showing a paste surface feeding direction as the "SHEET SET DIRECTION". Selection items of the "SHEET SET DIRECTION" of the image forming apparatus 100 is in accordance with the specification of the image forming apparatus 100 (see FIG. 11). For that reason, in the case where the pressure-bonding postcard sheet for the outward three-folding is selected, the selection items of the "SHEET SET DIRECTION" are the "PSTE" and the "PSLE". Further, in the case of this embodiment, in the "setting screen", "page positions" (P1 to P6) for forming the "address surface" on the pressure-bonding postcard sheet are displayed in a selectable manner.

Further, in the "setting screen", the "FEEDING DIRECTION" and the "FOLDING DIRECTION" of the folding processing apparatus 400 are displayed. Although illustration is omitted, in the case where the specification of the pressure-bonding processing apparatus 200 is acquired from the pressure-bonding processing apparatus 200, the "FEEDING DIRECTION" and the "FOLDING DIRECTION", are displayed in accordance with the acquired specification. In the case where the specification cannot be acquired from the folding processing apparatus 400, the "FEEDING DIRECTION" and the "FOLDING DIRECTION" may be made capable of being selectively inputted by the user.

Although illustration is omitted here, it may only be required that either one of the "FDLE" and "FDTE" is selectable as the "FEEDING DIRECTION", and either one of the "FDVF" and "FDMF" is selectable as the "FOLDING DIRECTION".

Next, the "pressure-bonding printed matter selecting screen" (S5 of FIG. 6) displayed at the liquid crystal display portion 710 in the case where the pressure-bonding postcard sheet for the outward three-folding is used will be described. In each of parts (a) and (b) of FIG. 12, an example of the "pressure-bonding printed matter selecting screen" during the Z-folding is shown. Part (a) of FIG. 12 shows the "pressure-bonding printed matter selecting screen" before the change in image formation order of the image forming data, and part (b) of FIG. 12 shows the "pressure-bonding printed matter selecting screen" after the change in image formation order of the image forming data. In parts (a) and (b) of FIG. 13, preparation examples of pressure-bonding postcards before and after the change in image formation order of the image forming data are show, respectively (Z-folding). Incidentally, in this case, the "sun mark", the "face mark", a "crescent mark", and a "heart mark" are the secret information images, and the "cloud mark" and the "address surface" are the non-secret information images.

As shown in part (a) of FIG. 12 and part (a) of FIG. 13, before the change in image formation order of the image forming data, the "face mark" and the "crescent mark" which are the secret information images are displayed on the non-paste surfaces of the first side and the second side, respectively. On the paste surface of the first side, the "sun mark" which is the secret information image and the "cloud mark" which is the non-secret information image are displayed, and on the paste surface of the second side, the "heart mark" which is the secret information image and the "address surface" which is the non-secret information image are displayed. That is, the image formation order of the image forming data is the "cloud mark", the "sun mark", and the "face mark" on the first side, and the "crescent mark", the "heart mark", and the "address surface" on the second side.

On the other hand, as shown in part (b) of FIG. 12 and part (b) of FIG. 13, after the change in image formation order of the image forming data, the "cloud mark" and the "address surface" which are the non-secret information images are displayed on the non-paste surface of the first side and the second side, respectively. On the paste surface of the first side, the "face mark" and the "sun mark" which are the secret information images are displayed, and on the paste surface of the second side, the "crescent mark" and the "heart mark" which are the secret information images are displayed. Further, an image forming direction of the "cloud mark", the "sun mark", and the "face mark" on the first side and an image forming direction of the "crescent mark", the "heart mark", and the "address surface" on the second side are opposite to those before the change in image formation order, respectively.

As described above, in the case where the "print processing execution" instruction and the "cancel" instruction are not provided (NO of both S6 and S7), the main controller 101 regards the "CORRECT" button of the "pressure-bonding printed matter selecting screen" as being operated, and changes the image formation order of the toner images in the image forming data on the basis of the "SHEET SETTING" (S8). In the case of this embodiment, the main controller 101 replaces the image formation order of the secret information images and the image formation order of the non-secret information images in the image forming data with each other. For example, as can be understood by comparing parts (a) and (b) of FIG. 12 with each other and by comparing parts (a) and (b) of FIG. 13 with each other, the image formation order of the "cloud mark", the "sun mark", and the "face mark" on the first side is changed to an order of the "face mark", the "sum mark", and the "cloud mark", and the image formation order of the "crescent mark", the "heart mark", and the "address surface" on the second side is changed to an order of the "address surface", the "heart mark" and the "crescent mark". Further, the main controller 101 rotates the images on the first side and the second side by 180 degrees, and thus changes the image forming orders so that the images are formed so as to be vertically inverted to the images before the change.

As in the above-described manner, in the case where the pressure-bonding postcard for the outward three-folding is prepared, the "pressure-bonding printed matter selecting screen" including completion images of the pressure-bonding printed matter changed in image formation order and image forming direction is displayed at the liquid crystal display portion 710. By this, even when the user sets the set mode S of the recording material S erroneously, so that there is no preparation of improper pressure-bonding printed matter such that the paste surface thereof is exposed to the surface thereof. Accordingly, the user needs not check whether or not the user erroneously sets the set mode of the recording material S, by taking the trouble to make trail printing as in the conventional manner, so that the user can efficiently prepare the pressure-bonding printed matter without trouble. Further, even in the case where the set mode of the recording material S is correct but the image formation order of the image forming data is incorrect, the images are formed on the basis of the image forming data changed in image formation order and image forming direction, so that the user can prepare an appropriate pressure-bonding printed matter without correct the image formation order of the image forming data.

Incidentally, in the above-described embodiment, the image forming system 1X in which the pressure-bonding processing apparatus 200 is connected as a different casing to the apparatus main assembly of the image forming apparatus 100 was described as an example, but the pressure-bonding processing apparatus 200 may be provided inside the apparatus main assembly (inside the same casing) of the image forming apparatus 100. In that case, the main controller 101 also operates as the folding processing controller 430 and the pressure-bonding processing controller 630, which are described above.

According to the present invention, the user can prepare the appropriate pressure-bonding printed matter depending on the set mode of the recording material without preparing the pressure-bonding printed matter in actuality.

(Other Embodiments)

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-196468 filed on Dec. 8, 2022, which is hereby incorporated by reference herein in its entirety.

What is claimed is:

1. An image forming system comprising:

an image forming apparatus including a stacking portion capable of stacking a recording material having an adhesive region in which an adhesive is applied onto a surface of the recording material, an image forming unit for forming an image on the recording material, and a fixing portion for fixing the image formed on the recording material;

a pressure-bonding processing apparatus including a folding processing portion for folding the recording material fed from the image forming apparatus, and a pressure-bonding portion capable of pressure-bonding the recording material folded by the folding processing portion under pressure application;

an inputting portion capable of inputting directions of a front surface and a back surface of the recording material stacked on the stacking portion; and a controller configured to change, in a case that the directions of the front surface and the back surface of the recording material inputted by the inputting portion are different from the directions of the front surface and the back surface in which a pressure-bonding printed matter is capable of being properly prepared, an image formation order of image forming data to an order in which the pressure-bonding printed matter is capable of being properly prepared in the directions of the front surface and the back surface of the recording material inputted by the inputting portion.

2. An image forming system according to claim 1, further comprising a displaying portion configured to display, in a case that the image formation order is changed, the pressure-bonding printed matter on which the image is formed in a changed image formation order.

3. An image forming system according to claim 2, wherein the displaying portion displays a first image formed on a first side of the recording material in the changed image formation order and a second image formed on a second side, opposite from the first side, of the recording material in the changed image formation order.

4. An image forming system according to claim 1, wherein the controller causes the image forming unit to form the image in a changed image formation order.

5. An image forming system according to claim 1, wherein the folding processing portion folds the recording material in two.

6. An image forming system according to claim 1, wherein the folding processing portion folds the recording material in three.

7. An image forming system comprising:

an image forming apparatus including a stacking portion capable of stacking a recording material having an adhesive region in which an adhesive is applied onto a surface of the recording material, an image forming unit for forming an image on the recording material, and a fixing portion for fixing the image formed on the recording material;

a pressure-bonding processing apparatus including a folding processing portion for folding the recording material fed from the image forming apparatus, and a pressure-bonding portion capable of pressure-bonding the recording material folded by the folding processing portion under pressure application;

an inputting portion capable of inputting directions of a front surface and a back surface of the recording material stacked on the stacking portion; and a displaying portion configured to display a first pressure-bonding printed matter depending on inputted directions of the front surface and the back surface of the recording material and image forming data in a first image formation order and a second pressure-bonding printed matter depending on the inputted directions of the front surface and the back surface of the recording material and image forming data in a second image formation order different from the first image formation order.

8. An image forming system according to claim 7, wherein the displaying portion displays a first image formed on a first side of the recording material in the first and second image formation orders and a second image formed on a second side, opposite from the first side, of the recording material in the first and second image formation orders.

9. An image forming system according to claim 7, wherein the folding processing portion folds the recording material in two.

10. An image forming system according to claim 7, wherein the folding processing portion folds the recording material in three.

11. An image forming system comprising:

an image forming apparatus including a first stacking portion capable of stacking a recording material having an adhesive region in which an adhesive is applied onto a surface of the recording material, a second stacking portion capable of stacking the recording material having the adhesive region in which the adhesive is applied onto the surface of the recording material, an image forming unit for forming an image on the recording material, and a fixing portion for fixing the image formed on the recording material, wherein the recording material stacked on the first stacking portion is turned upside down from a stacked state and then is fed to the image forming unit, and the recording material stacked on the second stacking portion is fed the image forming unit without being turned upside down;

a pressure-bonding processing apparatus including a folding processing portion for folding the recording material fed from the image forming apparatus, and a pressure-bonding portion capable of pressure-bonding the recording material folded by the folding processing portion under pressure application;

a controller capable of executing an operation in a preparation mode for preparing a pressure-bonding printed matter by folding and pressure-bonding the recording material, on which the image is formed on the basis of image forming data, while controlling the image forming apparatus and the pressure-bonding processing apparatus; and an inputting portion capable of inputting directions of a front surface and a back surface of the recording material stacked on the first stacking portion, or capable of inputting the directions of a front surface and the back surface of the recording material stacked on the second stacking portion, wherein the controller changes, in a case that the directions of the front surface and the back surface of the recording material inputted by the inputting portion are different from the directions of the front surface and the back surface in which a pressure-bonding printed matter is capable of being properly prepared, an image formation order of image forming data to an order in which the pressure-bonding printed matter is capable of being properly prepared in the directions of the front surface and the back surface of the recording material inputted by the inputting portion.

12. An image forming system according to claim 11, further comprising a displaying portion configured to display the pressure-bonding printed matter on which the image is formed in a changed image formation order.

13. An image forming system according to claim 12, wherein the displaying portion displays a first image formed on a first side of the recording material in the changed image formation order and a second image formed on a second side, opposite from the first side, of the recording material in the changed image formation order.

14. An image forming system according to claim 11, wherein the controller causes the image forming unit to form the image in a changed image formation order.

15. An image forming system according to claim 11, wherein the folding processing portion folds the recording material in two.

16. An image forming system according to claim 11, wherein the folding processing portion folds the recording material in three.

* * * * *